(12) United States Patent
Kumar et al.

(10) Patent No.: US 10,984,595 B2
(45) Date of Patent: Apr. 20, 2021

(54) METHOD AND APPARATUS FOR PROVIDING GUIDANCE IN A VIRTUAL ENVIRONMENT

(71) Applicant: Samsung Electronics Co., Ltd., Gyeonggi-do (KR)

(72) Inventors: Arun Kumar, Noida (IN); Kapil Kumar, Noida (IN); Barun Kumar, Noida (IN)

(73) Assignee: Samsung Electronics Co. Ltd

( * ) Notice: Subject to any disclaimer, the term of this patent is extended or adjusted under 35 U.S.C. 154(b) by 17 days.

(21) Appl. No.: 15/868,653

(22) Filed: Jan. 11, 2018

(65) Prior Publication Data

US 2018/0204380 A1  Jul. 19, 2018

(30) Foreign Application Priority Data

Jan. 13, 2017 (IN) .............................. 2017-11001540

(51) Int. Cl.
| | |
|---|---|
| G06T 19/00 | (2011.01) |
| G06T 19/20 | (2011.01) |
| G06F 3/01 | (2006.01) |
| G06F 3/0346 | (2013.01) |

(52) U.S. Cl.
CPC ............ *G06T 19/003* (2013.01); *G06F 3/011* (2013.01); *G06F 3/012* (2013.01); *G06F 3/0346* (2013.01); *G06T 19/20* (2013.01); *G06T 2219/024* (2013.01); *G06T 2219/2012* (2013.01); *G06T 2219/2016* (2013.01)

(58) Field of Classification Search
CPC ........ G06T 19/003; G06T 19/20; G06F 3/012
See application file for complete search history.

(56) References Cited

U.S. PATENT DOCUMENTS

| | | | |
|---|---|---|---|
| 8,276,080 B2 | 9/2012 | Tatsubori | |
| 8,365,213 B1 | 1/2013 | Orlowski | |
| 8,730,266 B2 | 5/2014 | Brown et al. | |
| 9,476,724 B2 * | 10/2016 | Caine ................. | G01C 21/3453 |

(Continued)

OTHER PUBLICATIONS

International Search Report dated Apr. 17, 2018 issued in counterpart application No. PCT/KR2018/000556, 9 pages.

(Continued)

*Primary Examiner* — Samantha (Yuehan) Wang
(74) *Attorney, Agent, or Firm* — The Farrell Law Firm, P.C.

(57) ABSTRACT

The present disclosure provides a method and apparatus for providing guidance in a virtual environment. The apparatus includes a communication interface configured to transmit or receive data; a memory associated with at least one processor; and the at least one processor configured to identify a path traversed by a user in a virtual environment while consuming interactive content through a head mounted display, identify one or more portions of the interactive content that have been played on the head mounted display, analyze the identified path to determine missed or viewed sections of the virtual environment and analyze the identified one or more portions to determine missed or viewed portions of the interactive content, and process the interactive content based on the missed or viewed sections of the virtual environment and the missed or viewed portions of the interactive content.

17 Claims, 15 Drawing Sheets

(56) References Cited

U.S. PATENT DOCUMENTS

| | | |
|---|---|---|
| 2002/0152117 A1 | 10/2002 | Cristofalo et al. |
| 2003/0174178 A1 | 9/2003 | Hodges |
| 2010/0045660 A1 | 2/2010 | Dettinger et al. |
| 2010/0241525 A1* | 9/2010 | Aguera y Arcas ..... G06F 3/011 |
| | | 705/26.1 |
| 2013/0271456 A1 | 10/2013 | Haswell et al. |
| 2013/0321461 A1 | 12/2013 | Filip |
| 2015/0234455 A1 | 8/2015 | LaValle et al. |
| 2015/0352437 A1* | 12/2015 | Koseki .................... A63F 13/25 |
| | | 463/31 |
| 2016/0005229 A1* | 1/2016 | Lee ....................... G06F 3/0488 |
| | | 345/419 |
| 2016/0124502 A1 | 5/2016 | Sawyer et al. |
| 2016/0148417 A1* | 5/2016 | Kim .................... G05D 1/0044 |
| | | 345/419 |
| 2017/0307888 A1* | 10/2017 | Kohler ............... G02B 27/0093 |
| 2019/0130193 A1* | 5/2019 | Leppanen ............ H04N 5/4403 |

OTHER PUBLICATIONS

Kieran Latham et al., "A Case Study on the Advantages of 3D Walkthroughs over Photo Stitching Techniques", XP033102144, 2016 International Conference on Virtual Reality and Visualization (ICVRV), Sep. 24, 2016, 8 pages.

Gun A. Lee et al., "AntarcticAR: An Outdoor AR Experience of a Virtual Tour to Antarctica", XP-32531332. IEEE International Symposium on Mixed and Augmented Reality—Arts, Media, and Humanities (ISMAR—AMH), Oct. 4, 2013, 10 pages.

European Search Report dated Aug. 22, 2019 issued in counterpart application No. 18739336.8-1216, 11 pages.

* cited by examiner

METHOD AND APPARATUS FOR PROVIDING GUIDANCE IN A VIRTUAL ENVIRONMENT

PRIORITY

This application claims priority under 35 U.S.C. § 119(a) to Indian Patent Application Serial No. 2017-11001540 filed in the Indian Intellectual Property Office on Jan. 13, 2017, the disclosure of which is incorporated herein by reference herein.

BACKGROUND

1. Field of the Disclosure

The present disclosure relates generally to a method and apparatus for providing guidance in a virtual environment.

2. Description of the Related Art

Virtual reality (VR) is a computer technology that uses software-generated realistic images, sounds, and other sensations, to replicate a real or imaginary environment, and simulate a user's physical presence to enable the user to interact with this environment. A virtual reality device usually has a capability to provide a 360 degree view of surroundings. Accordingly, if two users are watching same content on respective head mounted displays, and one of them is keeping his head straight and the other one is keeping his head up, they will see different content on their respective screens at the same point in time. VR devices have a tracking unit that interacts with an internal or external control unit to relay, to the control unit, the orientation of the user's point of view. The tracking unit could be based on electromagnetic waves, acoustic (sound) waves, optical (infrared) rays, or a mechanical system. A set of images is sent to the display screen of the VR device according to an orientation of the user's point of view.

A lot of research has already been done in different areas of virtual reality. One set of research deals with different ways of gaze tracking using illumination and sensors to determine what point on a screen a user is viewing. This can be used in applications, such as games, to select a graphical user interface element. Another set of research deals with using an optical positioning tracking system for warning a user of a head mounted display of potential collisions with real-world obstacles, such as walls or furniture. Yet another set of research deals with calculating the orientation of a head mounted display based on user's head movement to propose which frame should be displayed at a particular moment based on the orientation. Other research deals with making groups or profiles of users and showing content relevant to said groups or profiles. Some other research deals with detecting the movement of avatars and putting a reference mark in response to detecting the movement.

Despite these areas of research in VR, it is difficult, and sometimes impossible, for a user (or a content generator) to know how well the user viewed a particular content, or whether he viewed all of the content, or missed some content, and what content he missed.

SUMMARY

The present disclosure has been made to address at least the above problems and/or disadvantages and to provide at least the advantages described below. According to an aspect of the present disclosure, an apparatus includes a communication interface configured to transmit or receive data; a memory associated with at least one processor; and the at least one processor configured to identify a path traversed by a user in a virtual environment while consuming interactive content through a head mounted display, identify one or more portions of the interactive content that have been played on the head mounted display, analyze the identified path to determine missed or viewed sections of the virtual environment and analyze the identified one or more portions to determine missed or viewed portions of the interactive content, and process the interactive content based on the missed or viewed sections of the virtual environment and the missed or viewed portions of the interactive content.

According to another aspect of the present disclosure, a method includes identifying a path traversed by a user in a virtual environment while consuming interactive content through a head mounted display; identifying one or more portions of the interactive content that have been played on the head mounted display; analyzing the identified path to determine missed or viewed sections of the virtual environment and analysing the identified one or more portions to determine missed or viewed portions of the interactive content and processing the interactive content based on the missed or viewed sections of the virtual environment and the missed or viewed portions of the interactive content.

BRIEF DESCRIPTION OF THE DRAWINGS

The above and other aspects, features, and advantages of the present disclosure will be more apparent from the following description when taken in conjunction with the accompanying drawings, in which.

DETAILED DESCRIPTION

Figure 1:
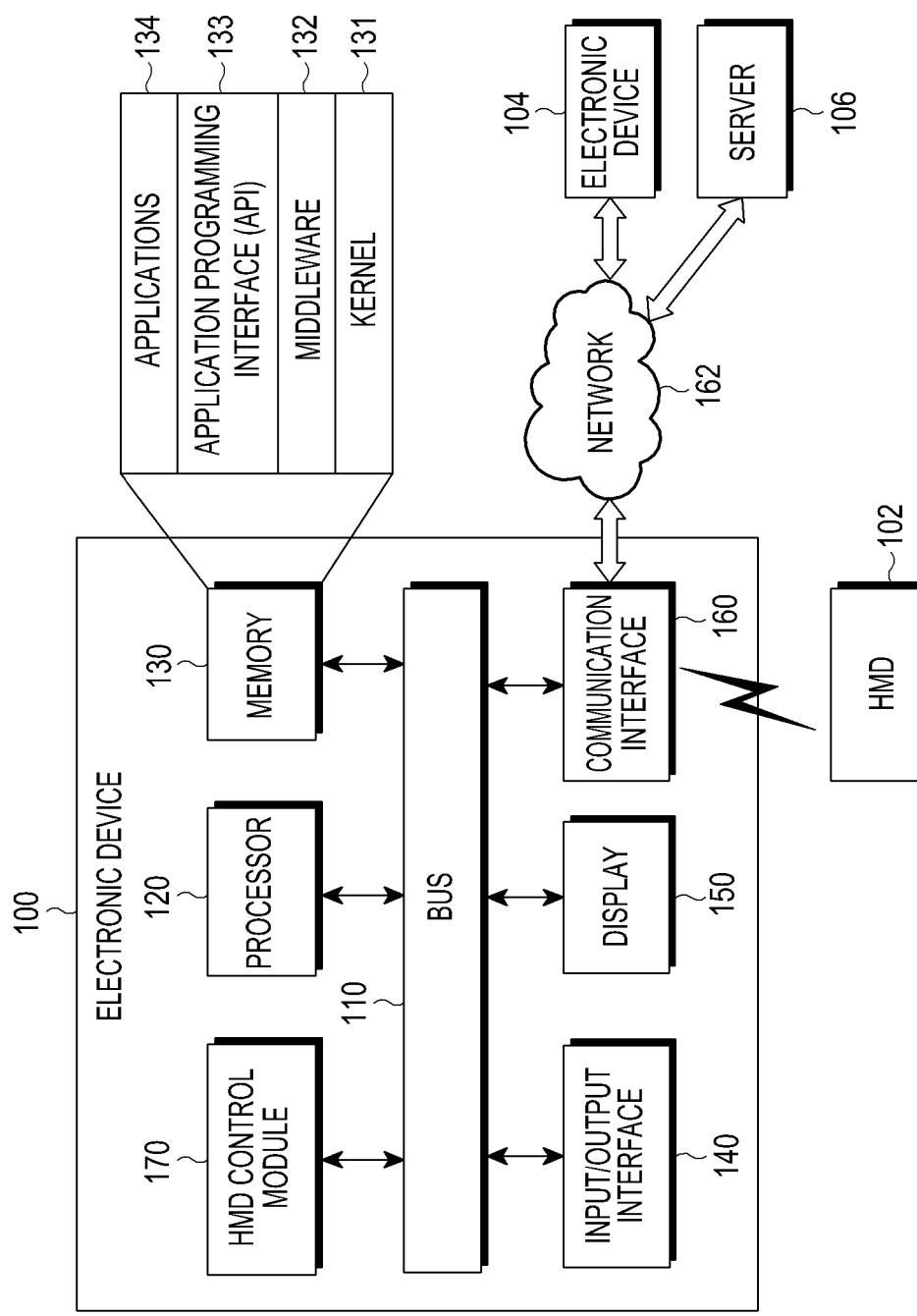
FIG. 1 illustrates a configuration of an electronic device, according to an embodiment of the present disclosure.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

Terms such as "includes" or "may include" refer to the presence of a corresponding function, operation or feature, and do not limit the presence of additional functions, operations or features. Also, terms such as "includes" or "has" refer to the presence of characteristics, numbers, operations, components or combinations thereof, and are not intended to exclude additional characteristics, numbers, operations, components or combinations thereof.

As used herein, the term "or" includes any and all combinations of terms listed. For example, "A or B" includes only A, only B, or both A and B.

Terms such as "first" or "second" may be used to describe various features, but do not limit such features. For example, these terms do not limit the order or the importance of their associated features. Such terms may be used to differentiate one feature from another. For example, a first user equipment (UE) and a second UE are both user equipment, but are different user equipment. A first component may be referred to as a second component, and likewise, a second component may be referred to as a first component.

If a component is said to be "connected with" or "connected to" another component, the component may be directly connected with, or connected to, the other component, or another component may exist in between. On the other hand, if a component is said to be "directly connected with" or "directly connected to" another component, no components exist in between.

When using the term "substantially", it is understood that the recited characteristic, parameter, or value need not be achieved exactly, but that deviations or variations, including, for example, tolerances, measurement errors, measurement accuracy limitations and other factors known to those of ordinary skill in the art, may occur in amounts that do not preclude the effect the characteristic was intended to provide.

The term "module" indicates, for example, a unit including a combination of one or more of hardware, software, or firmware. The term "module" may be interchangeably be used with the terms "unit," "logic," "logical block," "component," or "circuit." A "module" may be a minimum unit or part of the components integrally formed. The "module" may be a minimum unit or a part of one or more functions. A "module" may be implemented mechanically or electronically. For example, a "module" may include at least one of an application specific integrated circuit (ASIC), a field-programmable gate array (FPGA), or a programmable-logic device for performing operations which are well known or will be developed.

Unless defined otherwise, all terms used herein have the same meaning as commonly understood by those of ordinary skill in the art. Such terms as those defined in a generally used dictionary are to be interpreted to have the same meanings as the contextual meanings in the relevant field of art, and are not to be interpreted to have ideal or excessively formal meanings unless clearly defined in the present specification.

An electronic device may include multimedia functionality. For example, the electronic device can include at least one of a smartphone, a tablet personal computer (PC), a mobile phone, a video phone, an e-book reader, a desktop PC, a laptop PC, a netbook computer, a personal digital assistant (PDA), a portable multimedia player (PMP), a set-top box, a TV box, or a game console.

Similarly, an HMD, according to various embodiments of the present disclosure, is a display device, worn on the head or as part of a helmet or goggles, that has a small display optic in front of one eye (a monocular HMD) or each eye (a binocular HMD). Examples of the HMD include, but are not limited to, optical head-mounted display (OHMD), augmented or VR HMDs, 2D monoscopic HMDs, 3D stereoscopic HMDs, monocular HMDs, binocular HMDs, smart goggles or headsets.

FIG. 1 illustrates a configuration of an electronic device, according to an embodiment of the present disclosure.

Referring to FIG. 1, the electronic device 100 includes a bus 110, a processor 120, a memory 130, an input/output interface 140, a display 150, a communication interface 160, and an HMD control module 170.

The bus 110 interlinks the processor 120, the memory 130, the input/output interface 140, the display 150, the communication interface 160, and the HMD control module 170 of the electronic device 100 and controls communications between the components.

The processor 120 receives an instruction from at least one of the memory 130, the input/output interface 140, the display 150, the communication interface 160, and the HMD control module 170 of the electronic device 100 via the bus 110, interprets the received instruction, and performs an operation or processes data according to the interpreted instruction. The processor 120 controls execution of at least one program stored in the memory 130 to provide a service corresponding to the program.

The processor 120 may include one or more application processors (APs) or one or more communication processors (CPs). For example, an AP and a CP may be included in the processor 120 or in different respective integrated circuit (IC) packages. Alternatively, the AP and the CP may be included in a single IC package.

The AP controls hardware or software components connected to the AP by driving an operating system or an application program, and processes various data including multimedia data and operations. For example, the AP may be implemented using a system on chip (SoC).

The CP performs at least part of a multimedia control function. The CP identifies and authenticates a device in a communication network using a subscriber identity module (SIM) card. In so doing, the CP provides a user with services including video telephony, text message, and packet data. The CP controls data transmission and reception of the communication interface 160.

The AP or the CP loads and processes an instruction or data received from its non-volatile memory or at least one of the other components, in a volatile memory. The AP or the CP stores data received from or generated by at least one of the other components, in the non-volatile memory.

The CP manages data links and converts a communication protocol in a communication between the electronic device including hardware and other electronic devices connected over the network. The CP may be implemented using a SoC.

The processor 120 may include one or more data processors, an image processor, and a codec. The electronic device 100 may separately include a data processor, an image processor, or a codec. The processor 120 may further include a graphics processing unit (GPU).

The memory 130 stores the instruction or the data received from or generated by one or more of the processor 120, the input/output interface 140, the display 150, the communication interface 160, and the HMD control module 170 of the electronic device 100.

The memory 130 stores one or more programs for the service of the electronic device 100. For example, the memory 130 may include a kernel 131, a middleware 132, an application programming interface (API) 133, and applications 134. The program may be implemented using a program module, and the programming module may be implemented using software, firmware, and hardware, or a combination of at least two of them.

The kernel 131 controls or manages the bus 110, the processor 120, and the memory 130 used to execute operations or functions of the middleware 132, the API 133, or the applications 134. Also, the kernel 131 provides an interface for allowing the middleware 132, the API 133, or the application 134 to access, control or manage the individual components of the electronic device 100.

The middleware 132 relays data between the API 133 or the applications 134 and the kernel 131. The middleware 132 load-balances task requests received from at least one application by giving priority of the bus 110, the processor 120, or the memory 130 of the electronic device 100 to the task requests.

The API 133, which is an interface for the applications 134 to control a function provided from the kernel 131 or the middleware 132, may include at least one interface or function (e.g., instruction) for file control, window control, image processing, or text control.

The applications 134 may include a short message service (SMS)/multimedia messaging service (MMS) application, an e-mail application, a calendar application, an alarm application, a health care application (e.g., an application for measuring an amount of exercise or a blood sugar level), or an environmental information application (e.g., an application for providing air pressure, humidity, or temperature information). Alternatively, the applications 134 may be involved in information exchange between the electronic device 100 and an electronic device 104 or the HMD 102. The information exchange applications may include, for example, a notification relay application for relaying certain information to an external electronic device or a device management application for managing the external electronic device.

The notification relay application may relay the notification information of an SMS/MMS application, an e-mail application, a health care application, or an environmental information application of the electronic device 100 to the external electronic device 104 or the HMD 102. Alternatively, the notification relay application may receive and provide the notification information from the external electronic device 104 or the HMD 102 to the user. The device management application turns on/off at least part of the function of the external electronic device 104 or the HMD 102 communicating with the electronic device 100, controls brightness (or resolution) of the display, and manages (e.g., install, delete, or update) a service (e.g., a call service or a messaging service) provided by an application of the external electronic device 104 or by the external electronic device 104 itself.

The applications 134 may include an application designated based on an attribute (e.g., a type of the electronic device) of the external electronic device 104 or the HMD 102. For example, when the external electronic device is an MP3 player, the applications 134 may include a music playing application. Similarly, when the external electronic device 104 is a mobile medical device, the applications 134 may include a health care application. The applications 134 may include at least one of the applications designated in the electronic device 100 and the application received from a server 106, the electronic device 104, or the HMD 102.

The memory 130 may include an internal memory or an external memory. The internal memory may include at least one of, for example, volatile memory (e.g., dynamic RAM (DRAM), static RAM (SRAM), synchronous dynamic RAM (SDRAM)) or non-volatile memory (e.g., one-time programmable read only memory (ROM) (OTPROM), programmable ROM (PROM), erasable and programmable ROM (EPROM), electrically erasable and programmable ROM (EEPROM), mask ROM, flash ROM, NAND flash memory, or NOR flash memory). The internal memory may employ a solid state drive (SSD).

The external memory may include at least one of a compact flash (CF) memory card, a secure digital (SD) memory card, a micro-SD memory card, a mini-SD memory card, an extreme digital (xD) memory card, or a memory stick.

The input/output interface 140 forwards an instruction or data input from the user through an input/output device (e.g., a sensor, a keyboard, or a touch screen) to, for example, the processor 120, the memory 130, the communication interface 160, or the HMD control module 170 via the bus 110. The input/output interface 140 may forward data of the user's touch input through the touch screen, to the processor 120, and may output an instruction or data received from the processor 120, the memory 130, the communication interface 160, or the HMD control module 170 via the bus 110, through an input/output device (e.g., a speaker or a display). The input/output interface 140 may output voice data processed by the processor 120 to the user through the speaker.

The display 150 displays various information (e.g., multimedia data or text data) to the user.

The communication interface 160 establishes the communication between the electronic device 100 and the external device 104, the server 106, or the HMD 102. The communication interface 160 may communicate with the external device over the network 162 using wireless communication or wired communication. The wireless communication may include at least one of wireless fidelity (WiFi), bluetooth (BT), near field communication (NFC), GPS, and cellular communication (e.g., long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM)). The wired communication may include at least one of a universal serial bus (USB), a high definition multimedia interface (HDMI), a recommended standard (RS) 232, or a plain old telephone service (POTS).

The network 160 may be the communication network and may include at least one of a computer network, the Internet, the Internet of things (IoT), and a telephone network. The protocol (e.g., transport layer protocol, data link protocol, or physical layer protocol) for the communication between the electronic device 100 and the external device may be supported by at least one of the applications 134, the API 133, the middleware 132, the kernel 131, and the communication interface 160.

The electronic device 100 may further include a sensor module. The sensor module may include at least one of a gesture sensor, a gyro sensor, an atmospheric pressure sensor, a magnetic sensor, an acceleration sensor, a grip sensor, a proximity sensor, an image color sensor, a biometric sensor, a temperature sensor, a humidity sensor, a light sensor, and an ultra violet (UV) light sensor.

The sensor module measures a physical quantity or detects an operation status of the electronic device 100, and converts the measured or detected information to an electric signal. For example, the sensor module may include an electronic nose (E-nose) sensor, an electro myography (EMG) sensor, an electro encephalogram (EEG) sensor, or an electro cardiogram (ECG) sensor.

The HMD control module 170 may be configured to identify a path traversed by a user in a virtual environment while consuming interactive content through the HMD 102; to identify one or more portions of the interactive content that have been played on the HMD 102; and to analyze the identified path to determine missed or viewed sections of the virtual environment and analyze the identified one or more portions to determine missed or viewed portions of the interactive content. Alternatively, this functionality of the HMD control module 170 can be included in the processor 120 or in a separate module in association with the processor 120.

The names of the components of the electronic device 100 may differ according to the type of the electronic device. The electronic device 100 may include one or more of the components, omit some components, or further include other components according to its type.

Figure 2A:
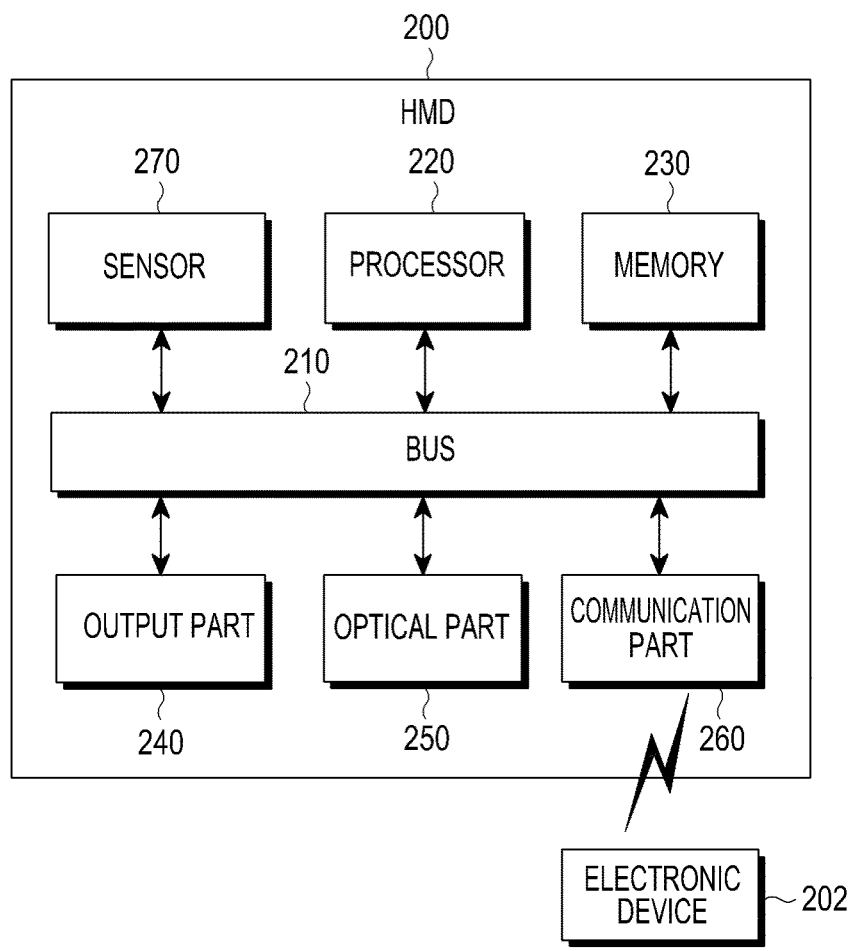
FIG. 2A illustrates a configuration of a head mounted device (HMD), according to an embodiment of the present disclosure.

FIG. 2A illustrates a configuration of an HMD to implement various embodiments of the present disclosure. The electronic device can be mounted to or detached from an HMD. The electronic device can have a shape corresponding to, but not limited to, a shape of the HMD. The electronic device can function while contacting at least part of the HMD. Further, the electronic device and the HMD may be integrated into one device by embedding some or all components of the electronic device in the HMD or by embedding some or all components of the HMD in the electronic device.

Referring to FIG. 2A, the HMD 200 includes a bus 210, a processor 220, a memory 230, an output part 240, an optical part 250, a communication part 260, and a sensor 270. The HMD 200 is wired or wirelessly connected to an electronic device 202 through the communication part 260 and associated with the electronic device 202.

The bus 210 interlinks the processor 220, the memory 230, the output part 240, the optical part 250, the communication part 260, and the sensor 270 of the HMD 200 and controls communications between the components.

The processor 220 receives an instruction from the components (e.g., the memory 230, the output part 240, the optical part 250, the communication part 260, and the sensor 270) of the HMD 200 via the bus 210, interprets the received instruction, and performs an operation or processes data according to the interpreted instruction. The processor 220 controls the execution of at least one program stored in the memory 230 to provide a service corresponding to the program.

When the HMD 200 is connected to the electronic device 202, the processor 220 shows a display screen of the electronic device 202 adjusted through the optical part 250, to the user. For example, the processor 220 divides the display screen of the connected electronic device 202 into two regions and displays the regions in two dimensions or three dimensions. The processor 220 provides the user with an augmented reality or a virtual reality through the optical part 250 and tracks the position based on head tracking information of the user provided from the sensor 270. The processor 220 may control the optical part 250 according to the head tracking information and thus show the adjusted display screen of the electronic device 202 to the user.

The processor 220 may be configured to identify a path traversed by a user in a virtual environment while consuming interactive content through the head mounted display 200; to identify one or more portions of the interactive content that have been played on the head mounted display 200; and to analyze the identified path to determine missed or viewed sections of the virtual environment and analyze the identified one or more portions to determine missed or viewed portions of the interactive content.

The processor 220 receives the external environment information obtained through the sensor, from the electronic device 202. For example, the processor 220 analyzes a distance to the external object based on the received external environment information (e.g., the depth information) and control the optical part 250 according to the analysis.

The processor 220 receives user input information obtained through the sensor, from the electronic device 202. The processor 220 may control the optical part 250 based on the received user input information (e.g., head gesture, hand gesture, and pupil movement information).

The memory 230 stores the command or the data received from or generated by one or more components (e.g., the processor 220, the memory 230, the output part 240, the optical part 250, the communication part 260, and the sensor 270) of the HMD 200.

The output part 240 outputs an analog audio signal fed from the processor 220. For example, the output part 240 includes a speaker, an earphone, a headset, or a display for displaying various information, such as multimedia data or text data, to the user.

The optical part 250 magnifies the display screen of the electronic device 202 and adjusts the focus of an image.

The communication part 260 can connect by wire or wirelessly to the electronic device 202. The communication part 260 connects to the electronic device 202 using wireless communications or a USB.

The sensor 270 obtains the user's head tracking information and tracks the head using a motion sensor including an acceleration sensor and a gyro sensor. The sensor 270 provides the obtained head tracking information to the processor 220.

The HMD 200 may further include an input part that may include a touchpad or a physical key button.

The names of the components of the HMD 200 may differ according to a type of the HMD 200. The HMD 200 may include one or more of the components, omit some components, or further include other components according to its type.

Figure 2B:
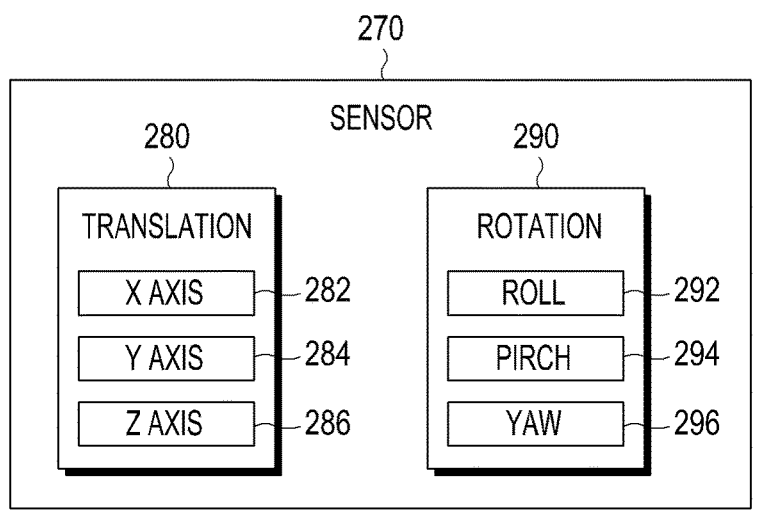
FIG. 2B illustrates a configuration of a sensor of the HMD or the electronic device, according to an embodiment of the present disclosure.

FIG. 2B illustrates a configuration of a sensor of the HMD, according to an embodiment of the present disclosure.

Referring to FIG. 2B, the head mounted display 200 is equipped with the sensor 270, which is a position and orientation sensor having at least 6 degree of freedom (DOF) sensors including 3 translation sensors 280 and 3 rotation sensors 290. The translation sensors 280 comprise a sensor for X axis 282, a sensor for Y axis 284, and a sensor for Z axis 286, while the rotation sensors 290 comprise a sensor for roll 292, a sensor for pitch 294, and a sensor for yaw 296.

Figure 3:
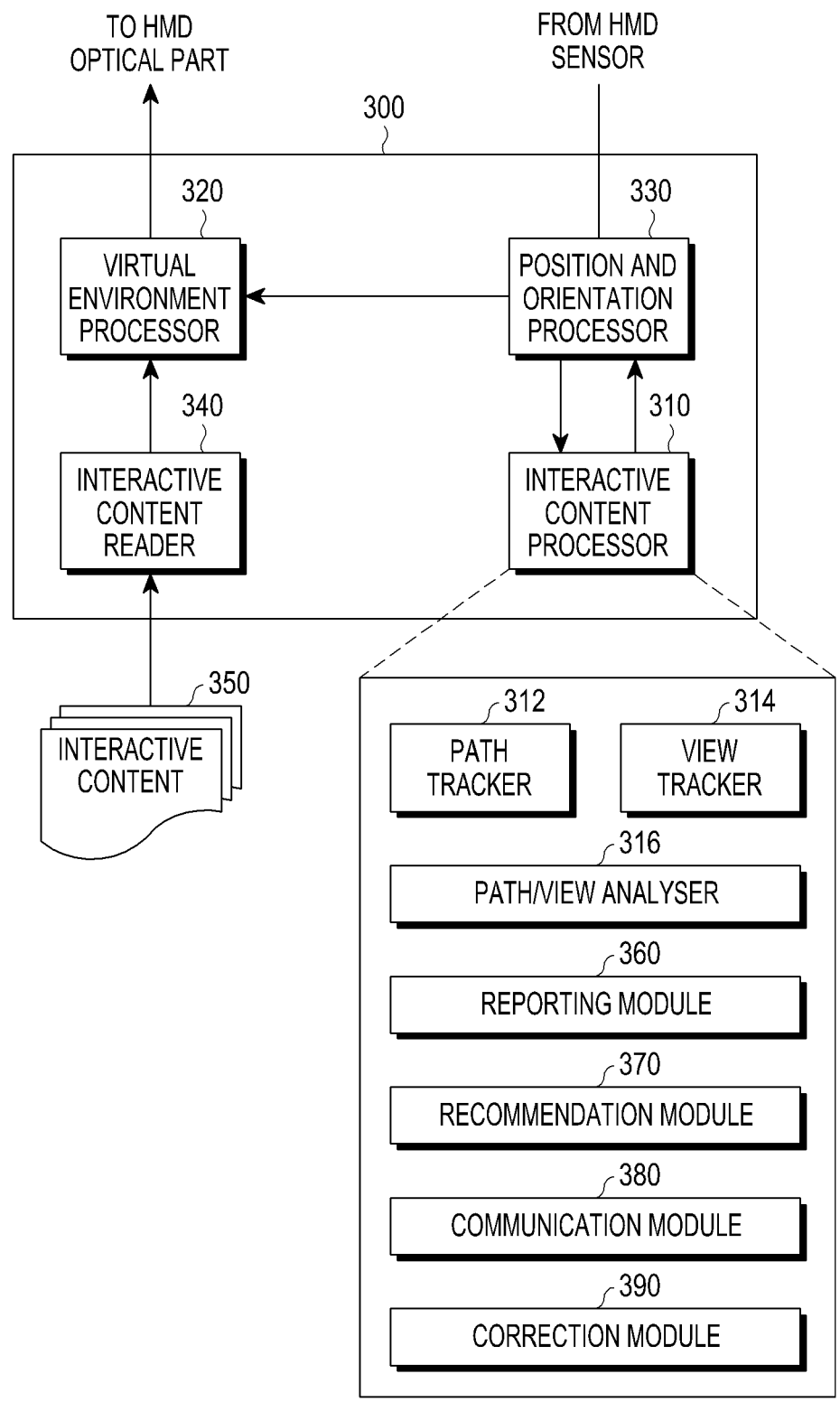
FIG. 3 is a block diagram of an apparatus, according to an embodiment of the present disclosure.

FIG. 3 is a block diagram of an apparatus, according to an embodiment of the present disclosure.

Referring to FIG. 3, the apparatus 300 can be implemented in the electronic device 100 shown in the FIG. 1 or the HMD 200 shown in the FIG. 2. Those of ordinary skill in the art will appreciate that each of above mentioned components and modules of the apparatus 300 may be implemented in one or more shown components of the electronic device 100 or the HMD 200. Alternatively, each of above mentioned components of the apparatus 300 may be implemented as one or more new components, which are not shown in FIGS. 1-2, of the electronic device 100 or the HMD 200.

The apparatus 300 comprises an interactive media processor 310 having a path tracker 312, a view tracker 314, and a path/view analyzer 316. The apparatus 300 further comprises a virtual environment processor 320, a position and orientation processor 330, and an interactive content reader 340 to read interactive content 350. The interactive content 350 may be immersive content, 3D content, virtual reality content, 360 degree content, or a combination thereof. The interactive media processor may further comprise additional modules, such as a reporting module 360, a recommendations module 370, a communications module 380, and a correction module 390.

Although the virtual environment processor 320, the position and orientation processor 330, the interactive content reader 340, the interactive content processor 350 are shown to be implemented in separate units, the apparatus may be implemented in the form so that at least two of the virtual environment processor 320, position and orientation processor 330, the interactive content reader 340, the interactive content processor 350 are integrated. For example, the virtual environment processor 320, the position and orientation processor 330, the interactive content reader 340, and the interactive content processor 350 may be implemented in a single processor. Alternatively, the apparatus may be implemented in a single processor.

The apparatus 300 is a video frame processing apparatus that processes interactive content and provides the processed content to the HMD. The position and orientation processor 330 gets the data from the position and orientation sensor equipped in the HMD 200 and processes the sensor data. This processed sensor data is further passed to the virtual environment processor 320. The virtual environment processor 320 gets the interactive content from the interactive content reader 340 and gets inputs from the position and orientation processor 330. The virtual environment processor 320 then processes the interactive content based on said inputs and sends the portion of processed interactive content to the HMD optical part for displaying it on the HMD.

The interactive content processor 310 is comprised of at least three sub units. First is the path tracker 312 that gets path data from the position and orientation processor 330 to keep track of user movements in a virtual environment, such as a tour of a virtual museum. Second is the view tracker 314 that gets view data from the position and orientation processor 330 to keep a track of which portion of the interactive content 350 has been watched. Third is the path/track analyzer 316 that processes the path and view data collected by the path tracker 312 and the view tracker 314. The processed data could which portion of the interactive content has been watched by the user, or what sections of the virtual museum the user hasn't visited during the tour.

The reporting module 360 generates various reports and the recommendations module 370 provides recommendations, based on the analysis conducted by the path/view analyzer module 316. The communications module 380 communicates the reports and the recommendations to one or more stakeholders, such as the user, a content generator, or a third party. The correction module 390 automatically, or based on inputs of a stakeholder, can correct the interactive content. The corrections module 390 can change certain portions of the interactive content. For example, if a portion of interactive content is repeatedly ignored by users despite it being visible, said portion may be replaced by a new portion. The corrections module 390 can also change an orientation or location of a certain portion. For example, if users have to move their head very far to the right to view content, said content may be moved towards the left for the comfort of the users or to increase its visibility. Further, the corrections module 390 can automatically add new portions or delete existing portions based on the inputs provided by the reporting module 360 or the recommendations module 370. Alternatively, a user can provide manual inputs to add new portions or delete existing portions. According to an embodiment of the present disclosure, an administrator can provide said manual inputs from a remote device communicatively coupled with the apparatus 300. Said manual inputs can be provided while the user is consuming the interactive content or after the user has consumed the interactive content.

In accordance with an embodiment of the present disclosure, the apparatus 300 comprises at least the path tracker 312, the view tracker 314, and the path/view analyzer 316, wherein the path tracker 312 identifies a path traversed by a user in a virtual environment while consuming interactive content 350 through the HMD, wherein the view tracker 314 identifies one or more portions of the interactive content 350 that have been played on the HMD, and wherein the path/view analyzer analyzes the identified path to determine missed or viewed sections of the virtual environment and analyzes the identified one or more portions to determine missed or viewed portions of the interactive content 350.

The apparatus 300 may further comprise the virtual environment processor 320 to process the interactive content 350 based on the missed or viewed sections of the virtual environment and the missed or viewed portions of the interactive content 350. The virtual environment processor may be configured to perform at least one of pointing, highlighting, captioning, or colour coding on the missed or viewed sections of the virtual environment and the missed or viewed portions of the interactive content 350.

The apparatus 300 may further comprise the position/orientation processor 330 to receive data from the position and orientation sensor of the HMD and to provide the received data to the path tracker 312, the view tracker 314, and the virtual environment processor 320.

The apparatus 300 may further comprise the reporting module 360 to generate a report for improving creation of the interactive content 350 based on the analysis of the identified path and the identified one or more portions. The report lists the missed or viewed sections of the virtual environment and the missed or viewed portions of the interactive content 350. The report may comprise at least one score pertaining to effectiveness of the interactive content 350.

The apparatus 300 may further comprise the recommendation module 370 to recommend an important section of the virtual environment or an important portion of the interactive content 350 to the user through the HMD. The important section of the virtual environment or the important portion of the interactive content 350 may be recommended to the user in real time while consuming the interactive content 350. Alternatively, the important section of the virtual environment or the important portion of the interactive content 350 may be recommended to the user after completion of the interactive content 350. The important section of the virtual environment or the important portion of the interactive content 350 may be contextually identified on the basis of point of interests to the user as captured from one or more data sources, such as social networks, user history, news, or user preferences. Furthermore, the recommendation module 370 may be configured to provide navigational directions in the virtual environment for going to the important section from a current location in the virtual environment; and provide head movement suggestions in the virtual environment for exploring the important portion of the interactive content 350 in the virtual environment.

The apparatus 300 may further comprise a communication module 380 to provide said report or recommendations directly to a remote device or through a server.

The apparatus 300 may further comprise a correction module 390 to automatically, or in response to a user input, modify the interactive content 350 on the basis of said report or recommendations.

The apparatus 300 may be an integral part of the HMD or the electronic device communicatively coupled with the HMD, wherein the HMD is capable of playing the interactive content 350 including at least one of immersive content, 3D content, virtual reality content, and 360 degree content, wherein the content may be music, games, photos, videos, documents, or webpages.

Figure 4:
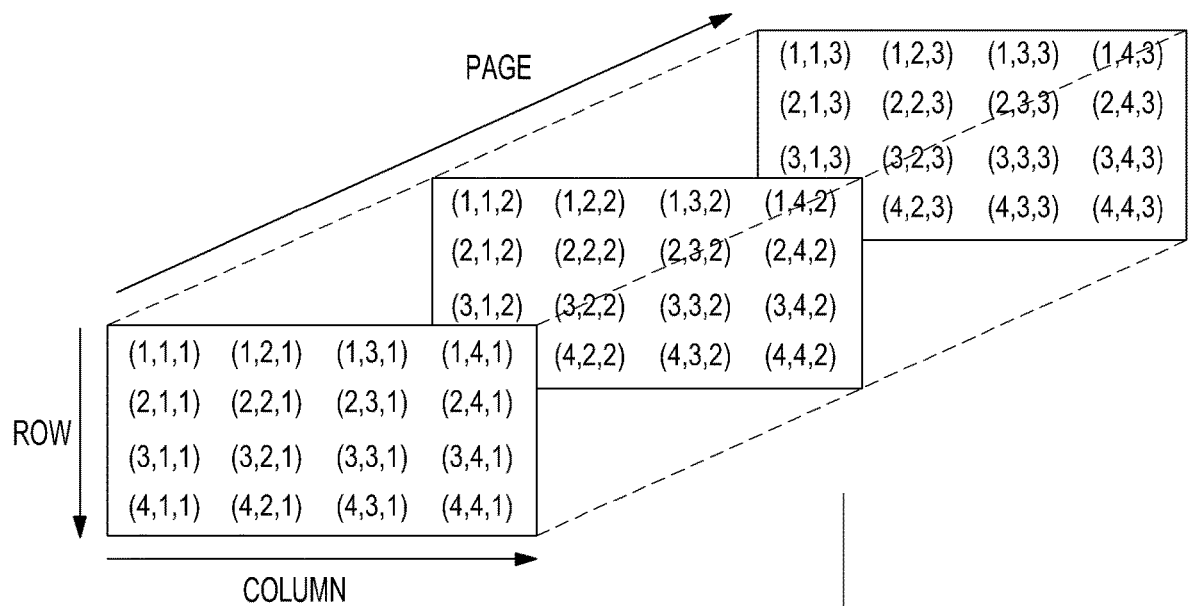
FIG. 4 illustrates an implementation of a path tracker, according to an embodiment of the present disclosure.

FIG. 4 illustrates an implementation of the path tracker 312 using three dimensional arrays. Every point in a 3D space can be represented by three coordinates, X, Y and Z, and hence every path can be represented by a unique 3D array. Based on the path taken by a user during a virtual tour, it can be determined which path he followed and which path he didn't follow. FIG. 4 shows a sample 3D array. If the user wandered around within the co-ordinates of this array, it can be determined that he followed a particular path. If he missed the co-ordinates of this array, it means he didn't follow the particular path.

Figure 5A:
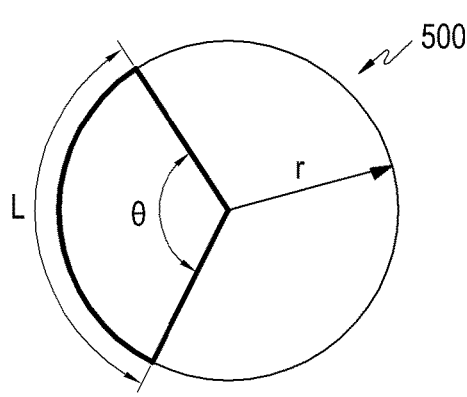
FIGS. 5A-5B illustrate an implementation of a view tracker, according to an embodiment of the present disclosure.
Figure 5B:
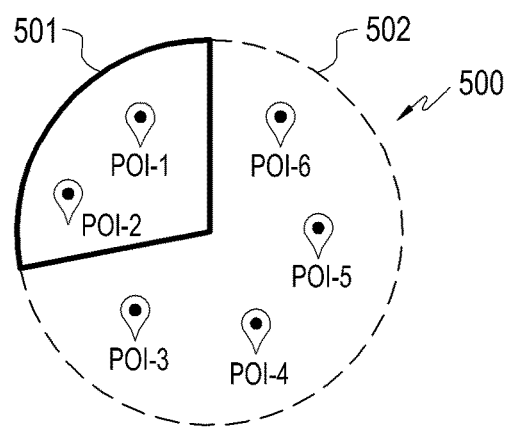

FIGS. 5A-5B illustrate an implementation of the view tracker 314 following the sectors of a circle 500. For simplicity, each point in a specific VR content can be represented by a circle and divided into sectors. Each sector can have a specific set of points of interest. The sensor data will be mapped to the sector and points of interest that were viewed by a user and points of interest that were not viewed by a user will be determined based on the mapped sector. Points of interest at a particular point in the virtual tour will be divided in several sectors. As shown in FIG. 5B, points of interest are in two different sectors—one showed by thick solid lines 501 and another by dotted lines 502. Other graphical schemes may be used for representing said different sectors.

Based on the data provided by the path tracker 312 and the view tracker 314, a detailed analysis is conducted by the path/track analyzer 316. Based on this detailed analysis, a variety of reports can be generated to indicate how many must-see items the user missed, how many he viewed, which critical path he took, which one did he miss, and what is the overall score of the effectiveness of the tour.

Figure 6:
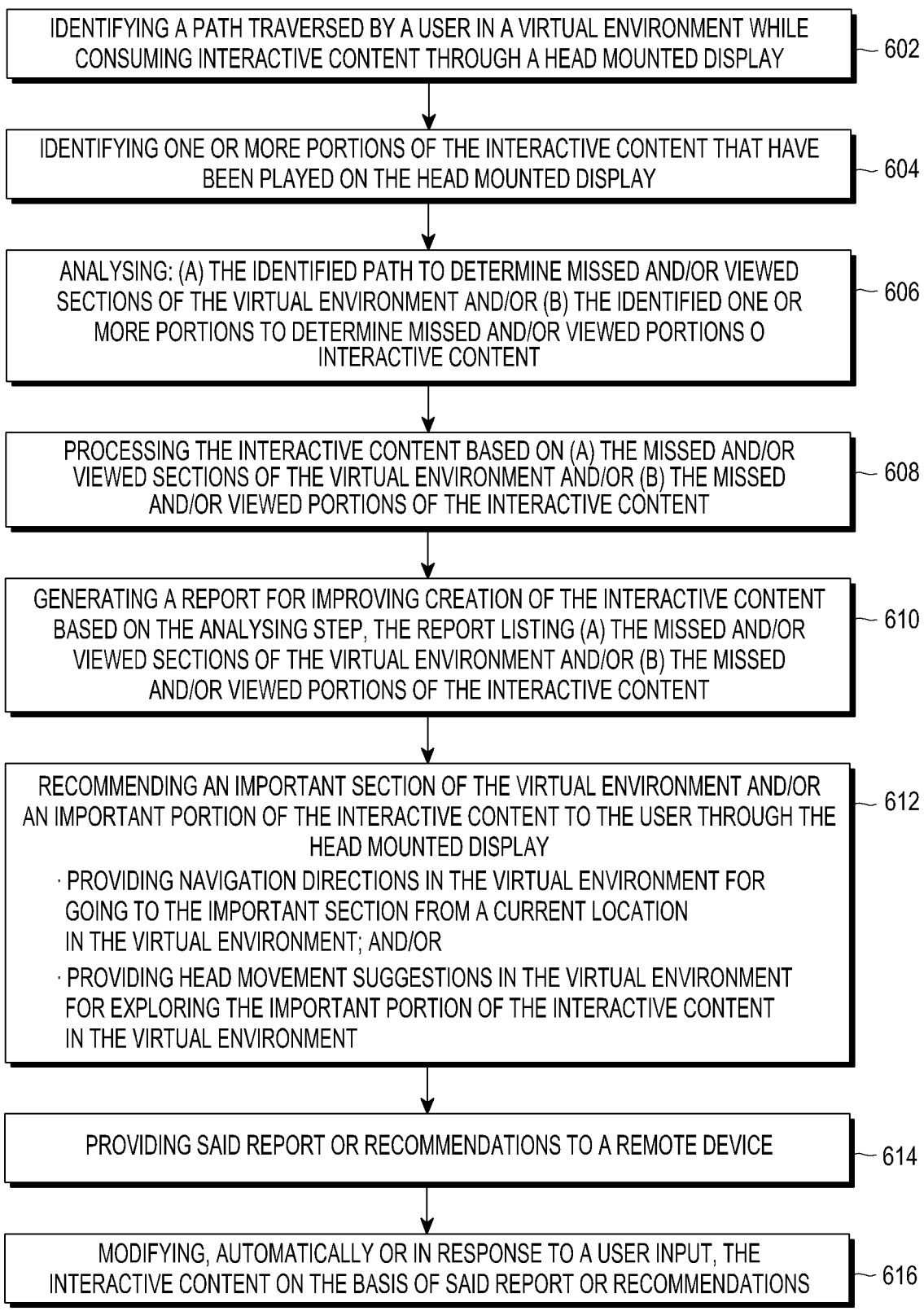
FIG. 6 is a flow chart illustrating a method, according to an embodiment of the present disclosure.

FIG. 6 is a flow chart illustrating a method, according to an embodiment of the present disclosure. Referring to FIG. 6, the method 600 may be implemented by the apparatus 300.

In step 602, the path tracker 312 identifies a path traversed by a user in a virtual environment while consuming interactive content through an HMD, such as the HMD 102 or the HMD 200.

In step 604, the view tracker 314 identifies one or more portions of the interactive content that have been played on the HMD.

In step 606, the path/view analyzer 316 analyzes the identified path to determine missed or viewed sections of the virtual environment and analyzes the identified one or more portions to determine missed or viewed portions of the interactive content.

In step 608, the virtual environment processor 320 processes the interactive content based on the missed or viewed sections of the virtual environment and the missed or viewed portions of the interactive content. The processing step 608 comprises at least one of pointing, highlighting, captioning, or colour coding on the missed or viewed sections of the virtual environment and the missed or viewed portions of the interactive content.

In step 610, the reporting module 360 generates a report for improving creation of the interactive content based on the analyzing step, the report listing the missed or viewed sections of the virtual environment and the missed or viewed portions of the interactive content. The report may comprise at least one score pertaining to effectiveness of the interactive content.

In step 612, the recommendations module 370 recommends an important section of the virtual environment or an important portion of the interactive content to the user through the HMD. The important section of the virtual environment or the important portion of the interactive content may be recommended to the user in real time while consuming the interactive content. Alternatively, the important section of the virtual environment or the important portion of the interactive content may be recommended to the user after completion of the interactive content. The important section of the virtual environment or the important portion of the interactive content may be contextually identified on the basis of points of interest to the user as captured from one or more data sources, such as a social network, user history, news, or user preferences. The recommendations module 370 may also provide navigational directions in the virtual environment for going to the important section from a current location in the virtual environment. The recommendations module 370 may also provide head movement suggestions in the virtual environment for exploring the important portion of the interactive content in the virtual environment.

In step 614, the communication module 380 provides said report or recommendations to a remote device.

In step 616, the corrections module 390 modifies, automatically or in response to a user input, the interactive content on the basis of said report or recommendations.

The interactive content may include at least one of an immersive content, 3D content, virtual reality content, and 360 degree content, wherein the content may be music, games, photos, videos, documents, and webpages.

Figure 7:
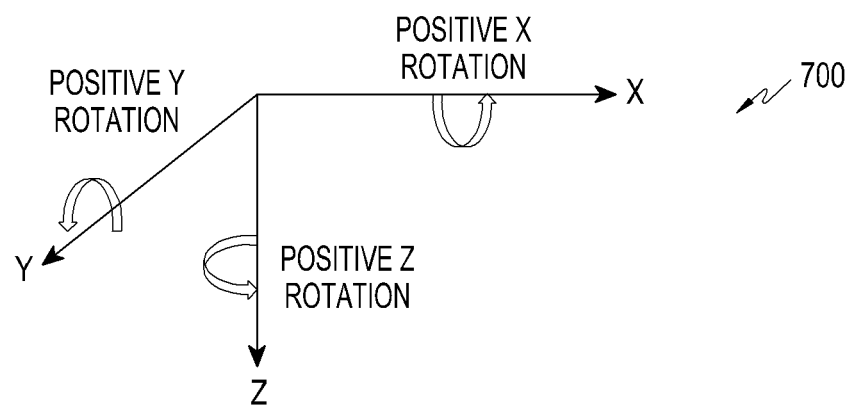
FIG. 7 illustrates a definition of rotation axis to implement various embodiments of the present disclosure.

FIG. 7 illustrates a definition 700 of rotation axis to implement various embodiments of the present disclosure.

In a Euler angle representation, a transformation from one coordinate frame to another can be carried out as three successive rotations about different axes. This type of representation is popular because of the physical significance of Euler angles that correspond to angles which would result by integrating signals from three orthogonal gyros in a stable platform inertial navigational system. The rotation around the X axis is called roll, the rotation around the Y axis is called pitch, and the rotation around the Z axis is called yaw. They are also respectively referred to as pan, tilt and heading.

In the rotation matrix, the three rotations are expressed mathematically as three separate directional cosine matrices C1, C2 and C3, where $\psi$ represents rotation around the z axis, θ represents rotation around the y axis, and φ represents rotation around the x axis. Here, yaw, pitch, and roll angles are respectively ψ, θ and φ.

$$C_1 = \begin{bmatrix} \cos\psi & \sin\psi & 0 \\ -\sin\psi & \cos\psi & 0 \\ 0 & 0 & 1 \end{bmatrix}$$

$$C_2 = \begin{bmatrix} \cos\theta & 0 & -\sin\theta \\ 0 & 1 & 0 \\ \sin\theta & 0 & \cos\theta \end{bmatrix}$$

$$C_3 = \begin{bmatrix} 1 & 0 & 0 \\ 0 & \cos\phi & \sin\phi \\ 0 & -\sin\phi & \cos\phi \end{bmatrix}$$

Thus a transformation from reference to body frame may be expressed as the product of the separate transformations.

$$C_n^b = C_b^{nT} = C_3 C_2 C_1$$

The directional cosine matrix is denoted by a 3×3 matrix, where the columns represent unit vectors in body axes projected along the reference axes. The element in the $i^{th}$ row and the $j^{th}$ column represents the cosine of the angle between the i axis of the reference frame and j axis of the body frame. The transformation from body to reference axes is given by $$C_b^n = C_1^T C_2^T C_3^T = \begin{bmatrix} \cos\psi & -\sin\psi & 0 \\ \sin\psi & \cos\psi & 0 \\ 0 & 0 & 1 \end{bmatrix} \begin{bmatrix} \cos\theta & 0 & \sin\theta \\ 0 & 1 & 0 \\ -\sin\theta & 0 & \cos\theta \end{bmatrix} \begin{bmatrix} 1 & 0 & 0 \\ 0 & \cos\phi & -\sin\phi \\ 0 & \sin\phi & \cos\phi \end{bmatrix} =$$

$$\begin{bmatrix} \cos\theta\cos\psi & -\cos\phi\sin\psi + \sin\phi\sin\theta\cos\psi & \sin\phi\sin\psi + \cos\phi\sin\theta\cos\psi \\ \cos\theta\sin\psi & \cos\phi\cos\psi + \sin\phi\sin\theta\sin\psi & -\sin\phi\cos\psi + \cos\phi\sin\theta\sin\psi \\ -\sin\theta & \sin\phi\cos\theta & \cos\phi\cos\theta \end{bmatrix}$$

A computational module uses this rotation vector, above, to calculate the view so that the virtual environment is aligned with respect to the position detected by sensors of an electronic device. In addition, the electronic device can keep track of what views were actually rendered on user's HMD and which views were not rendered.

To aid in understanding, an example of a virtual museum may be considered. Interactive content created to represent the virtual museum will provide a tour of the virtual museum to users. When a user wearing a virtual reality based HMD on his head moves his head to the left, he will be able to see what there is on a left wall, when he moves his head to the right, he will be able to see what there is on a right wall, when he moves his head up, he will be able to see what there is on a ceiling, and so forth. If, for example, he does not move his head to the right during the tour, he will not be able to see what there was on the right wall.

For the purposes of simplification, one can assume that VR content is nothing but a combination of hundreds or thousands of different views, or frames. When the user starts the virtual tour, his head is in the middle (i.e., at the gyro position 0, 0, 0 in the x, y, z coordinate space). At this position, the user enters the virtual museum. Now when the user moves his head slightly to the right (i.e., x, y, z becomes 1, 0, 0), the HMD will show the next frame which has some portion of the right side wall in it. When the user moves his head further to the right (i.e., at 2, 0, 0), the HMD will show the next frame that has more of the right side wall in it.

So based on the movement of user's head, the sensors will provide the current position and based on that, the current view will be determined. A unique identification number may be given to each view, and its frequency can be identified as indicated by the Table 1, below. Here, the frequency depicts how often each view was shown during the virtual tour.

TABLE 1

| X | Y | Z | View ID | Frequency |
|---|---|---|---------|-----------|
| 0 | 0 | 0 | 00001 | 1 |
| 1 | 0 | 0 | 00002 | 1 |
| 35 | 24 | 56 | 00003 | 0 |
| 45 | 261 | 76 | 00005 | 8 |

For a particular view, the first four columns (i.e., X, Y, Z, and View ID) will be fixed. While the user is going through the virtual tour, the last column (i.e., the frequency) will be updated in real time with each movement of the user.

Table 2, shown below, indicates how actual sections of the virtual museum can be mapped with X, Y, Z coordinates. The values in the Table 2 are merely one example, and the present disclosure is not limited to the values populated in the Table 2.

TABLE 2

| Section of museum | Range of X coordinate | Range of Y coordinate | Range of Z coordinate |
|---|---|---|---|
| Medieval History Section (Hall 1) | 127-308 | 345-549 | 987-1298 |
| Ancient History Section (Hall 2) | 309-711 | 550-839 | 1299-1439 |
| Cultural history Section (Hall 3) | 712-1180 | 840-1672 | 1440-2000 |

The values in the Table 3 show coordinates value ranges of each section of the museum. Using this Table 3, it can be figured out whether a user is currently watching Medieval History Section of the museum, Ancient History Section or Cultural History Section. For example, if a user's device is current at the coordinate 412, 645, 1340 (values of X, Y & Z respectively), then he is in Hall 2 watching Ancient History Section.

A desired report can be generated by combining the information given in Table 1 and Table 2. Examples of such reports include, but are not limited to, a report for which sections were visited, which ones were not, or a report for how much time the user spent on which sections of the museum. With a more extensive analysis, there can be further reports indicating the total number of important sections in the museum, how many important sections were visited, and how many were missed by the user, as shown in Table 3 below. The values in Table 3 are merely one example, and the present disclosure is not limited to the values populated in the Table 3.

TABLE 3

| Importance of different sections of museum | Total number of sections of this type | Visited | Missed | Percentage of visited sections |
|---|---|---|---|---|
| Must-See | 20 | 15 | 5 | 75% |
| Medium importance | 25 | 21 | 4 | 84% |
| Optional | 40 | 25 | 15 | 62.5% |

This Table 3 shows that the museum is divided into three sections—Must-see sections, Medium importance sections and Optional (least important) sections. Further, it shows that there are 20 must-see spots in the museum, and the user saw only 15 of them (i.e., 75%). He did not see the other 25% spots of Must-see importance. It provides similar data for Medium and least important spots.

Similar analysis can be done on contents related in other application areas. For instance, in flight simulator training, it can be very critical for the trainees to learn how to handle a particular type of scenario. Thus, the present disclosure relates to a wide range of application areas, including, but not limited to, education, travel, hospitality, and real estate. The description hereinafter uses the example of a tour of a virtual museum, but those of ordinary skill in the art will appreciate that the present disclosure can be similarly applied to any other type of virtual reality tour.

Figure 8:
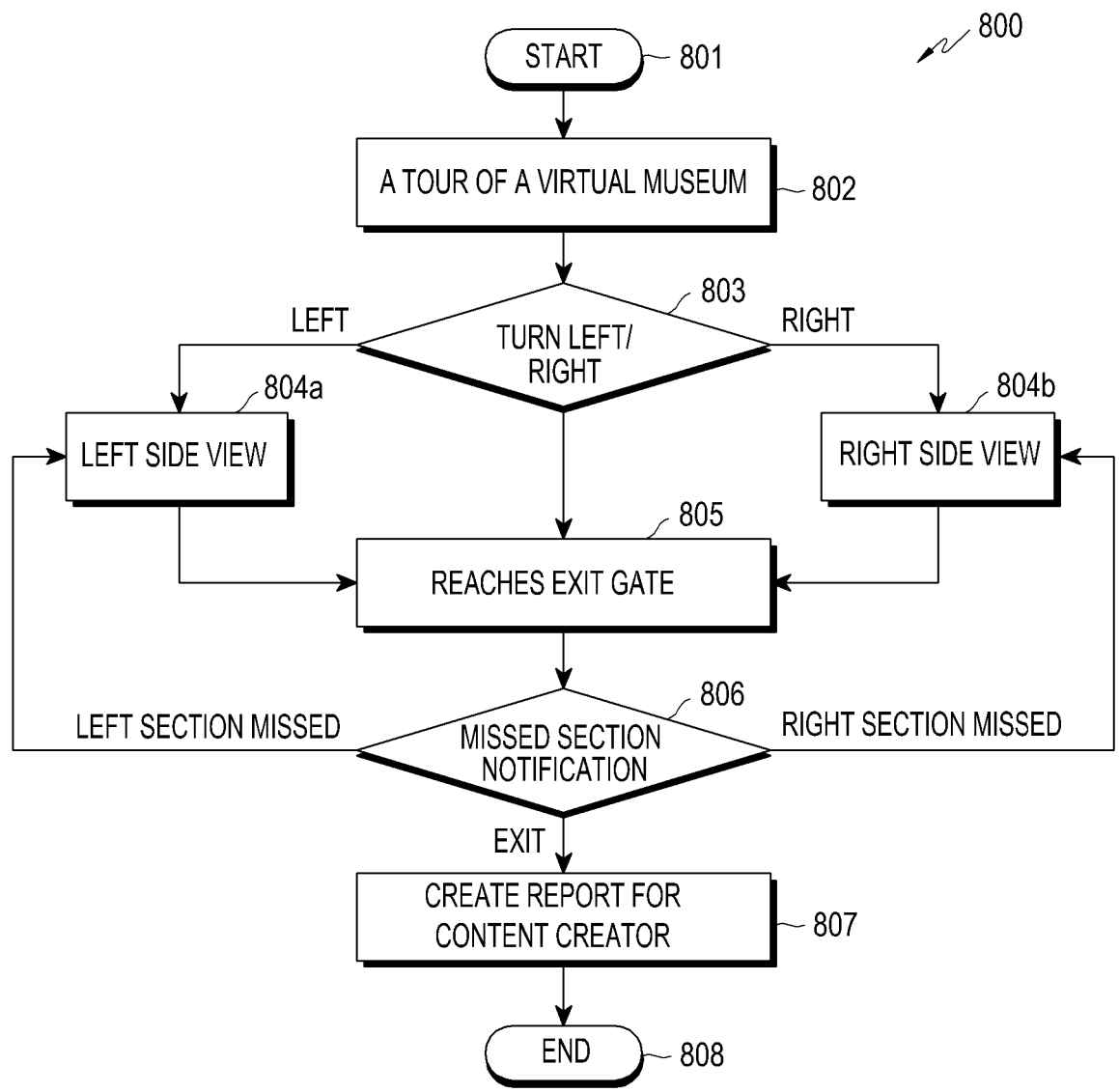
FIG. 8 illustrates a flow chart for a tour of a virtual museum, according to an embodiment of the present disclosure.

FIG. 8 illustrates a flow chart for a tour of a virtual museum, according to an embodiment of the present disclosure.

As shown in FIG. 8, the flow chart 800 starts at step 801. At step 802, a user starts taking a tour of the virtual museum through his HMD. At step 803, if the user takes a left turn first, then the user gets a left side view on his HMD at step 804a. At step 805, when the user reaches an exit gate, the user is notified at step 806 that he has missed the entire right section and its paintings. Accordingly, the user may decide at step 806 to not exit the virtual museum and rather go to right section at step 804b. The user may also decide to still exit at step 806 without seeing the right section, and a report is created for a content generator at step 807 to highlight that the user missed the right section and its paintings. Thereafter, the flow chart 800 ends at step 808.

At step 803, if the user takes a right turn first, then the user gets a right side view on his HMD at step 804b. At step 805, when the user reaches the exit gate, the user is notified at step 806 that he has missed the entire left section and its paintings. Accordingly, the user may decide at step 806 to not exit the virtual museum and rather go to the left section at step 804a. The user may also decide to still exit at step 806 without seeing the left section, and a report is created for a content generator at step 807 to highlight that the user missed the left section and its paintings. Thereafter, the flow chart 800 ends at step 808.

If the user sees both the left and right sections before exiting at step 806, then the report generated at step 807 indicates that the user saw both sections. Accordingly, an effectiveness score of the content will be higher for this report.

FIGS. 9A-9D illustrate a sample use case of the present disclosure. The use case illustrates analysis of virtual reality content. The content on a virtual reality device usually provides a 360 degree view of the surrounding area. So if two users are watching the same content on their respective HMDs, and one of them has kept his head straight and the other one is keeping his head up, they will see different content on their screens. Based on what type of content it is (i.e., education, entertainment, or gaming), it may be important for the viewer or the content generator to determine which parts of the content were viewed, which parts were not viewed, or how many users saw a particular section of the content. For example, if a user is watching a museum video, it may be helpful to know what parts of the museum the user missed (i.e., there were paintings on the roof which the user did not see).

For someone who is creating educational content, it may be helpful to know which sections of the video people watched, and which path they followed. Therefore, the content generator can know what sections of the content need improvement. For example, if there are 1000 users and 900 of them did not watch a certain part, then it is likely that the certain part needs improvement.

Figure 9A:
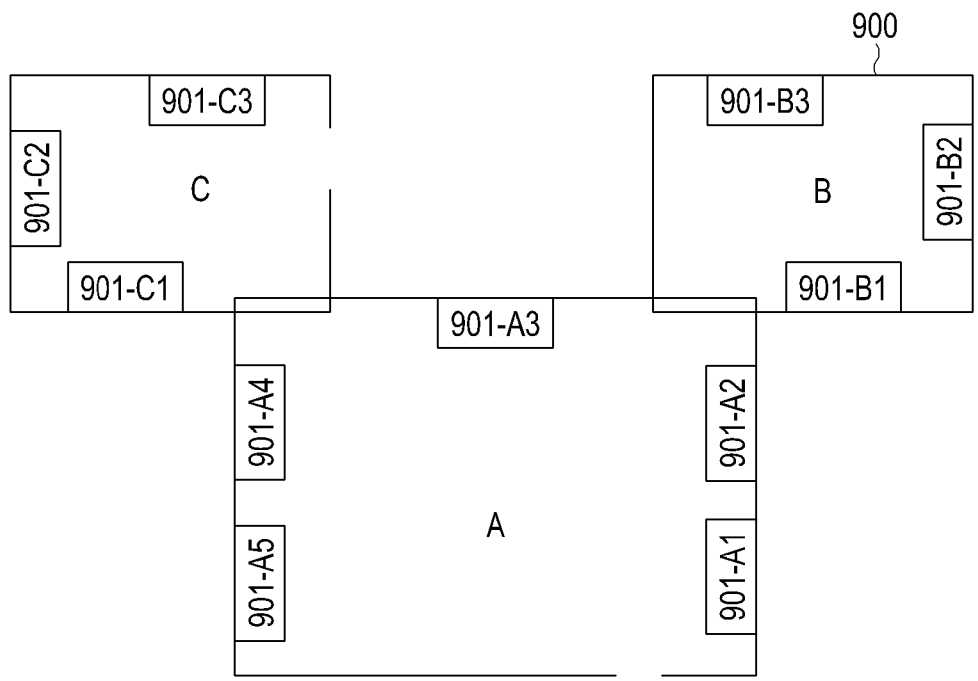
FIGS. 9A-9D, 10A-10F, 11A-11B, 12, 13, 14 and 15 each illustrate a sample use case, according to various embodiments of the present disclosure.

FIG. 9A illustrates a layout 900 of a virtual museum of which a user is going to take a tour through his HMD. The layout 900 comprises three sections, namely entry section A, intermediate section B, and an exit section C. The entry Section A comprises 5 paintings: 901-A1 and 901-A2 on right wall, 903-A3 on front wall, and 901-A4 and 901-A5 on left wall. The intermediate section B comprises 3 paintings: 901-B1 on back wall, 901-B2 on right wall, and 901-B3 on the front wall. The exit section C also comprises 3 paintings: 901-C1 on back wall, 901-C2 on right wall, and 901-C3 on the front wall. Once a tour is complete, there may be no way for a user to know which sections of the museum he visited and which he missed. Also, there may be no way for the creator of virtual tour to know how effective the tour was (i.e., did a user see all the important sections, what was most interesting, what was not tempting enough to explore—all this data is not available). In the absence of a guidance system of the present disclosure, a user may find himself lost in a virtual world, as there is no way to know how much he has gone through and how much is left to be explored.

Figure 9B:
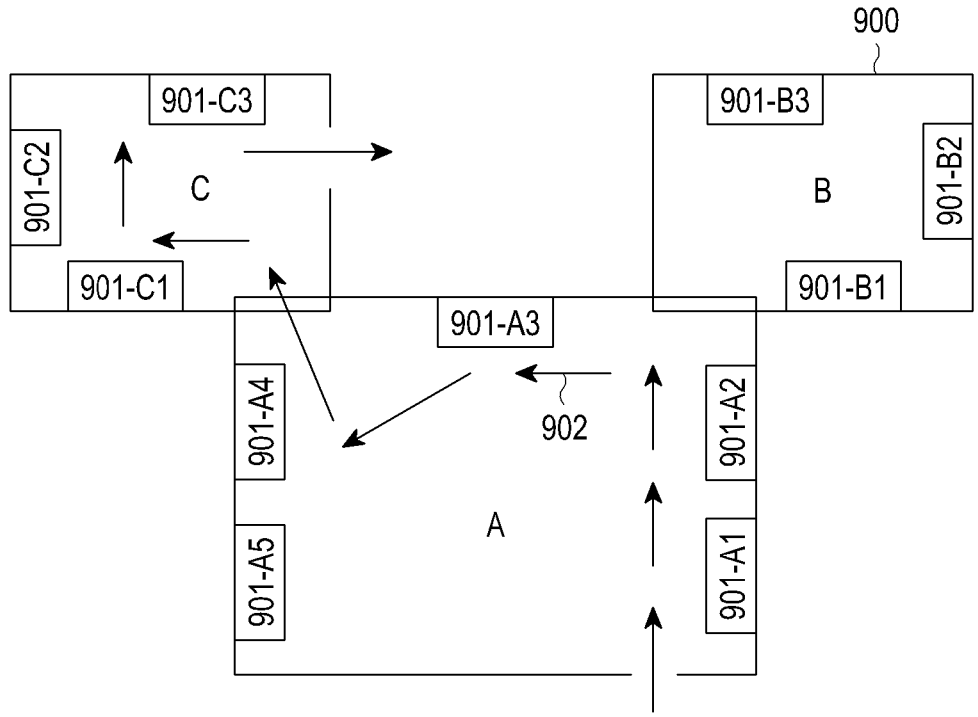

Referring to FIG. 9B, if the user takes a virtual tour of this museum and follows the path 902 provided by the arrows, there is no way for him to know whether he has seen the complete museum or not once he has completed his tour. He may have missed section B altogether but he will never come to know that he did not see it. In section A, he may have seen certain paintings and missed some other paintings. To this end, FIG. 9B depicts a sample path 902 traversed by the user while taking the tour of the virtual museum. As shown, the user enters Section A, sees paintings 901-A1 to 901-A3 on right and front walls, skips the left wall of Section A and the entire Section B, then goes to Section C to first see paintings 901-C1 to 901-C2 and then exit. Once the user has completed his tour, the guidance system of the present disclosure can show which sections/paintings he missed and which sections/paintings he viewed so he can understand which sections/paintings he did or did not see.

Figure 9C:
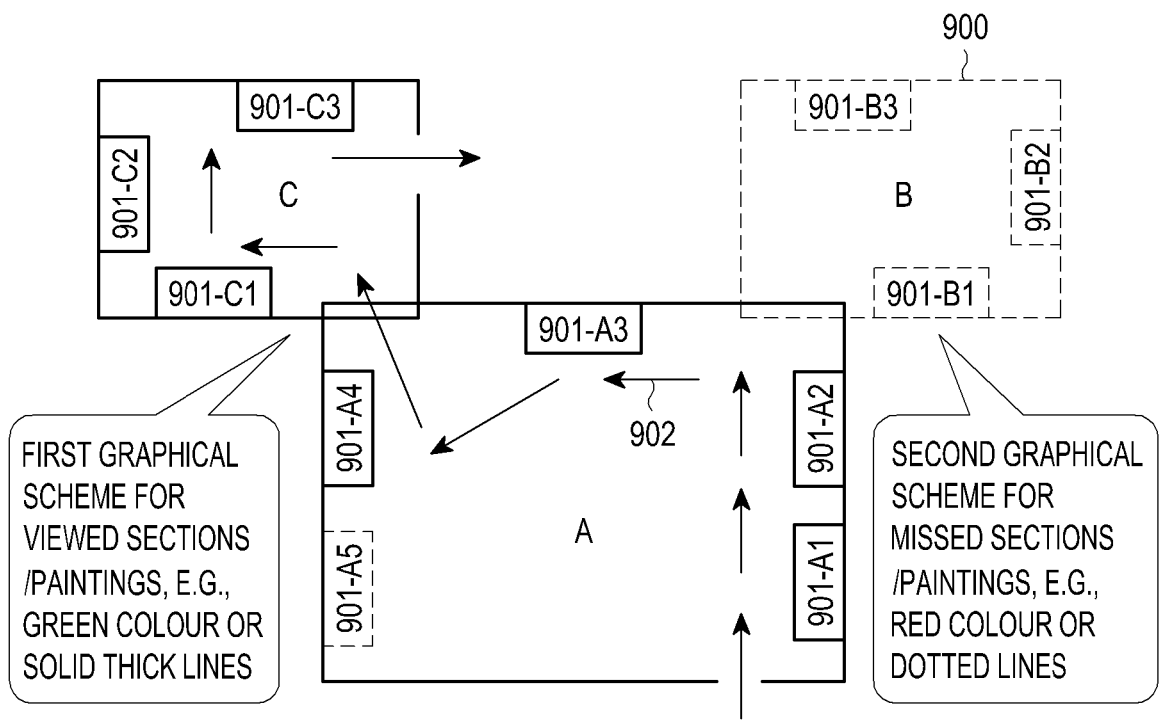

Referring to FIG. 9C, the path 902 traversed by a user in the virtual museum and the paintings seen by the user are identified and analyzed. The analysis determines what sections of the virtual museum and what paintings in those sections have been missed or have been viewed. Accordingly, the missed sections and missed paintings are shown in one graphical scheme, while the viewed sections and viewed paintings are shown in a different graphical scheme. The graphical scheme may include pointing, highlighting, captioning, or colour coding on the missed and the viewed sections/paintings. In the example shown in FIG. 9c, the missed sections/paintings are depicted in dotted lines, while the viewed sections/paintings are depicted in thick solid lines. In another example, the missed sections/paintings may be depicted in a red color, while the viewed sections/paintings may be depicted in a green color.

Figure 9D:
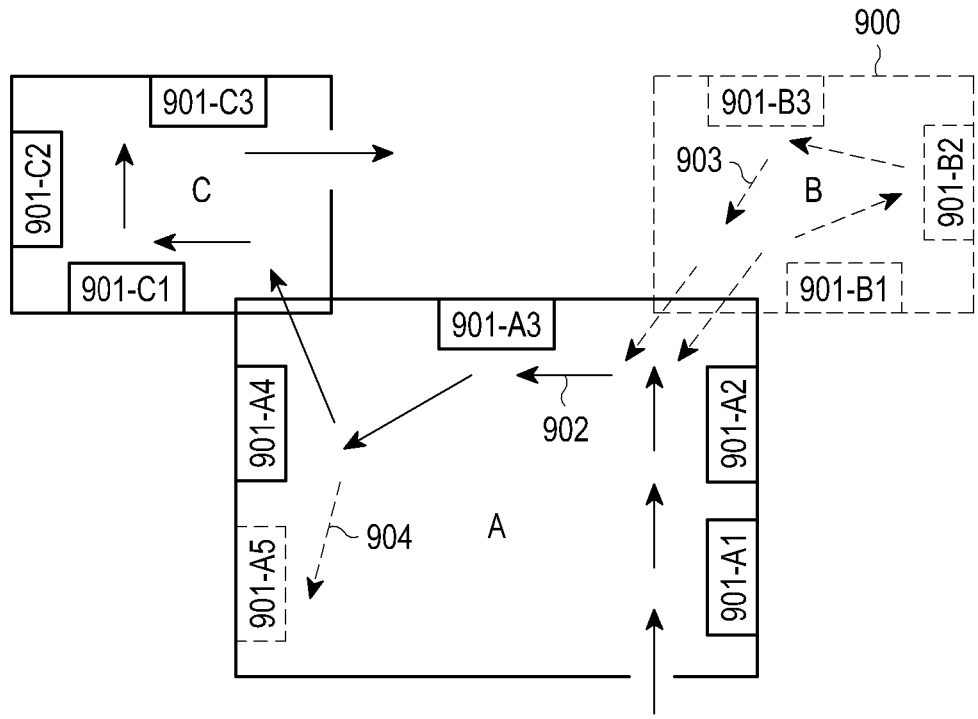

Referring to FIG. 9D, an important section of the virtual museum or an important painting may be recommended to the user in real time or after completion of the tour. The important sections of the virtual museum or an important painting may be contextually identified on the basis of points of interest to the user as captured from one or more data sources, such as social networks, user history, news, or user preferences. The recommendations may include navigational directions 903 in the virtual museum for going to the important section from a current location in the virtual museum, or head movement suggestions 904 in the virtual museum for exploring the important paintings in the virtual museum. To this end, a report may be generated to indicate which sections the user visited and which paintings the user saw. Such a report may be useful for content generators to determine the completeness of a virtual tour or to determine its effectiveness. The report may include a final score to that extent. The layout of the virtual museum may be modified, automatically, or in response to a user input, on the basis of said report or recommendations.

Referring to FIG. 9D, after the virtual tour completed, the user may be shown which section of the museum he visited and which sections he missed, with respect to the current location of user. Dotted lines may represent the sections which the user missed, and thick solid lines may represent the section which he visited. Therefore, the user can know where he is and if he wants to visit the missed areas, and which direction he should go to do it. For example, the user would know that he had missed section B. He would also know that, though he saw the left wall in Section A, one painting 901-A5 on the same wall never came on his screen.

FIGS. 10A-10F illustrate another sample use case of the present disclosure. An aspect of the present disclosure can be used when a user is taking a virtual tour of a museum on his VR device. The museum may have a complicated path, or the user may not know what things are worth seeing in each direction, so different types of things, including recommendations, may be detected for the user to best enjoy the tour. For example, the user may have missed some artifacts if he did not move his head towards a particular side wall which had some good artifacts, or maybe there were some paintings on the ceiling in a particular room which he did not move his head to see. It is also possible that the user did not enter a particular room or a particular floor of the museum. As per the present disclosure, such scenarios will be captured and a report will be generated at the end. Recommendations, such as, "You missed the Ancient History section on third floor" can be provided.

Figure 10A:
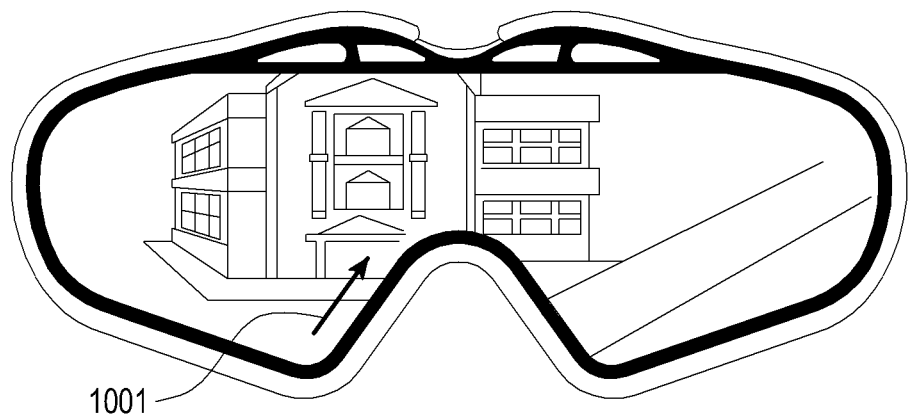

FIG. 10A illustrates the entrance of a virtual museum. An entry point can be pointed out to the user with help of an arrow 1001, a different color, a highlight, or a flash of light.

Figure 10B:
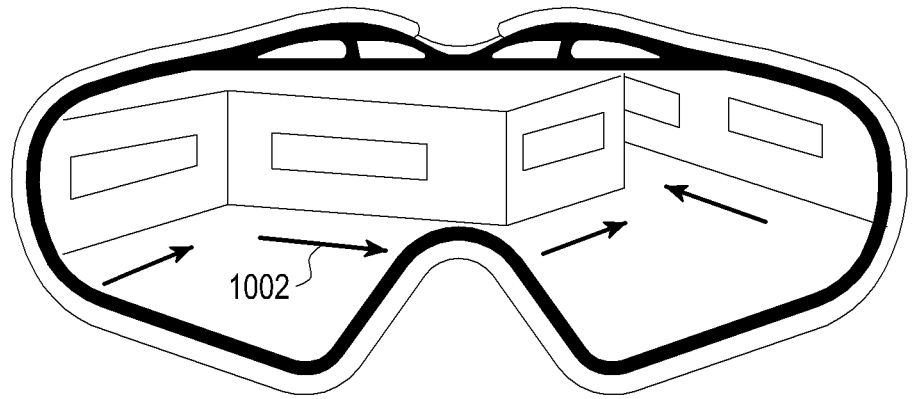

FIG. 10B illustrates a first section of a virtual museum. The arrows 1002 show all the possible paths in the hall that the user is supposed to take.

Figure 10C:
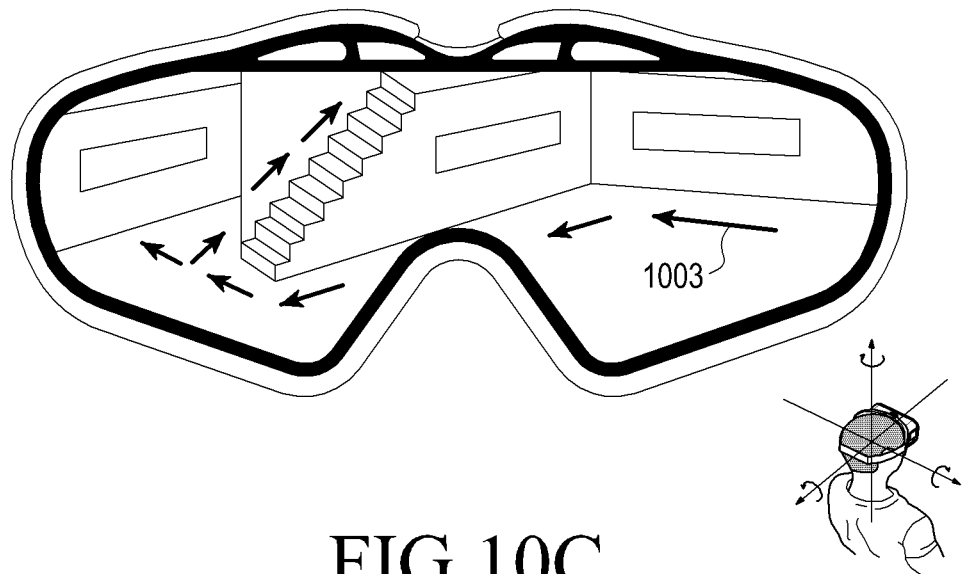

FIG. 10C illustrates a second section of the virtual museum. The arrows 1003 show all the possible paths available in the second section that the user can take if he wants to take a complete tour of the virtual museum. If the user wants to view everything, he should view all these sections of the virtual museum.

Figure 10D:
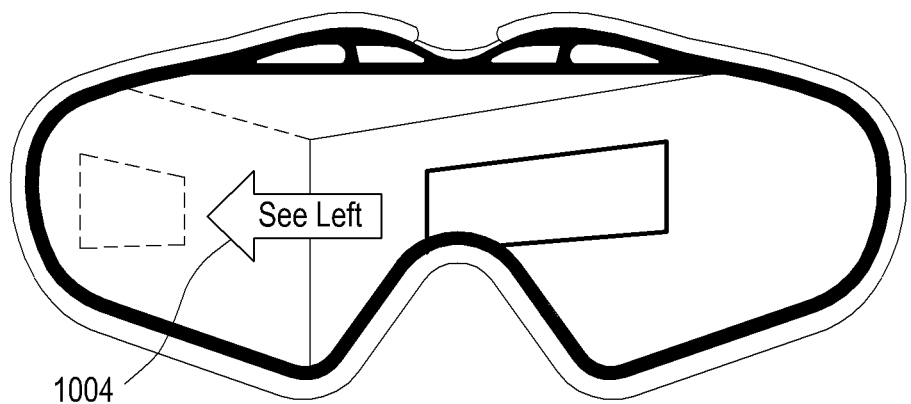

FIG. 10D illustrates which paintings in a view have been seen by the user (thick solid lines indicate the user has seen that painting) and which have been missed by user (dotted lines indicate the user has not seen that painting). Further, a recommendation 1004 may be provided to the user to suggest a head movement to view an important painting or a missed painting.

Figure 10E:
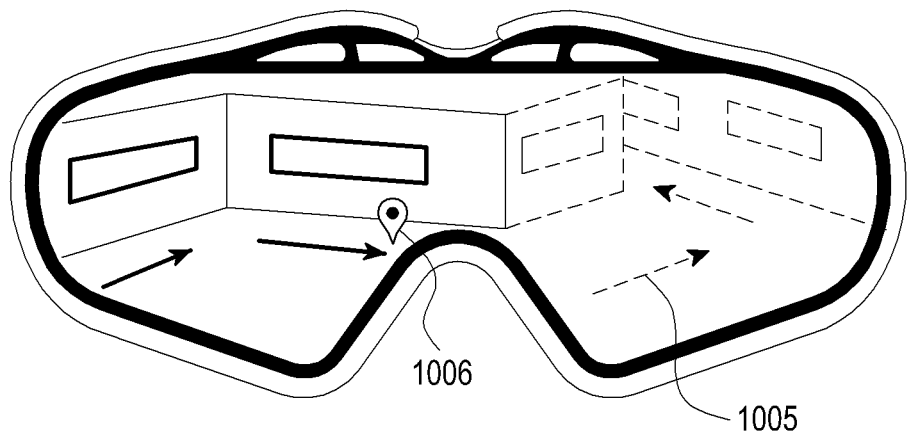

FIG. 10E illustrates which artifacts in the first section were seen by the user (thick solid lines indicate the user has seen that artifact) and which were missed by user (dotted lines indicate the user has not seen that artifact). Further, navigational directions 1005 to an important section or an important painting may be provided to the user from the current location 1006 of the user.

Figure 10F:
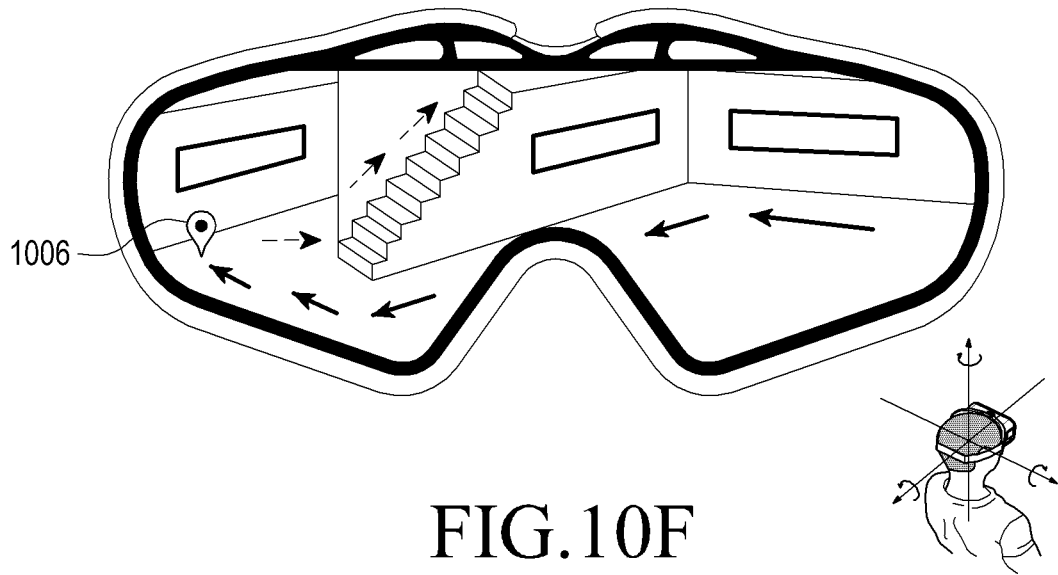

FIG. 10F illustrates which artefacts in the second section were seen by user (thick solid lines indicate the user has seen that artifact) and which were missed by user (dotted lines indicate the user has not seen that artifact). Further, navigational directions 1005 to an important section or an important painting may be provided to the user from the current location 1006 of the user. The user may be shown where he is in the tour and the views/paintings he has missed with respect to his current location, and if he wants to watch the missed paintings, then he knows which direction to move to.

Figure 11A:
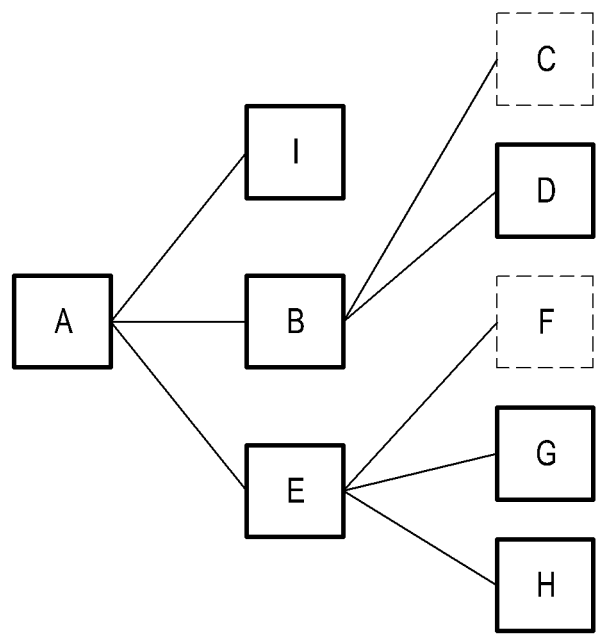
Figure 11B:
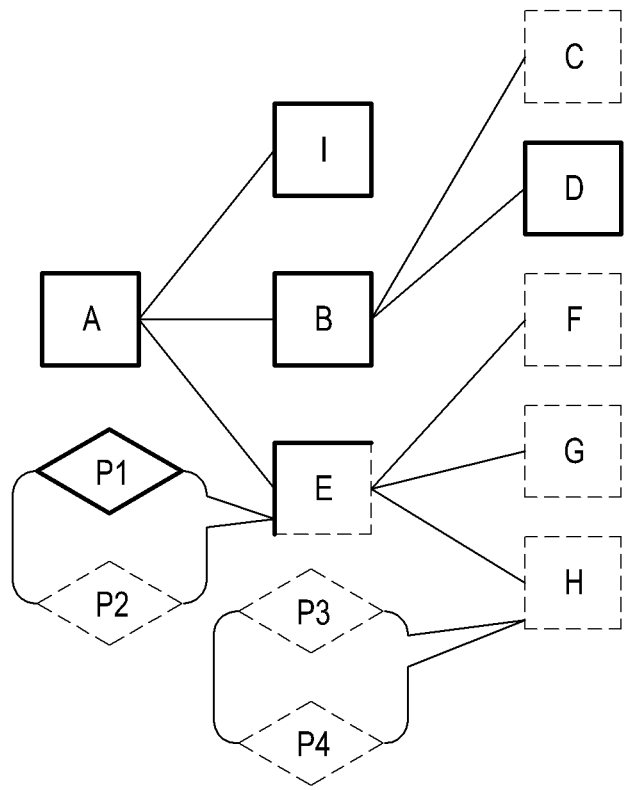

FIGS. 11A-11B describe an embodiment of the present disclosure using a tree structure. For simplification, a museum is assumed to have the layout shown in the tree structure of FIGS. 11A-11B. Each node, identified using letters A-H, is a section in the museum. The lines connecting nodes represent a gallery where some paintings may be displayed. For example, when a user is at point A, he has the option to move to B, I or E. When at B, he has the option to move to points C or D.

FIG. 11A illustrates which sections of a virtual museum a user visited (thick solid lines indicate the user visited that section) and which ones he missed (dotted lines indicate that the user missed that section). The user has missed the sections C and F in the example shown in the FIG. 11A. Those skilled in the art will appreciate that other graphic schemes may be used to differentiate between missed and viewed sections/paintings.

In FIG. 11B, sections of the museum are marked with letters A-H. In section E, there are paintings P1 and P2. Similarly, each section has certain paintings and other artifacts. At the end of tour, the user does not know which artifacts/paintings he saw and which ones he did not. However, according to FIG. 11B, the dotted lines of painting P2 show that user did not see it. Similarly, the 50% dotted lines of section E indicate that the user has seen 50% of the paintings in section E. Similarly, in section H, there are paintings P3 and P4. The dotted lines of painting P3 and P4 indicate that the user did not see them. Similarly, the 100% dotted lines of section H indicate that the user has not seen any of section H. A report can be generated for significant sections or paintings of the virtual museum to indicate whether the user has seen them or not.

TABLE 4

| Museum Room | Frame Ids |
|---|---|
| A | 0000-2993 |
| B | 2994-4500 |
| C | 4501-4803 |
| ... | ... |
| Gallery A-I | 5407-5637 |
| Gallery A-B | 5679-6573 |
| Gallery A-E | 6693-6783 |
| Gallery B-C | 6800-7649 |
| ... | ... |
| ... | ... |

Table 4, above, shows the mapping between different sections of the virtual museum. For each museum room (section) of the museum (A, B, etc.), there is a set of frame Ids, such that if a user is in section A, he is watching one of the frames 0000-2993. If the user is in the gallery connecting hall A and hall I, he is watching one of the frames in 5407-5637. Combining Table 1 and Table 4, whether a particular region was visited by the user or not can be determined. Finally, the user will be shown which sections he visited and which ones he missed.

Figure 12:
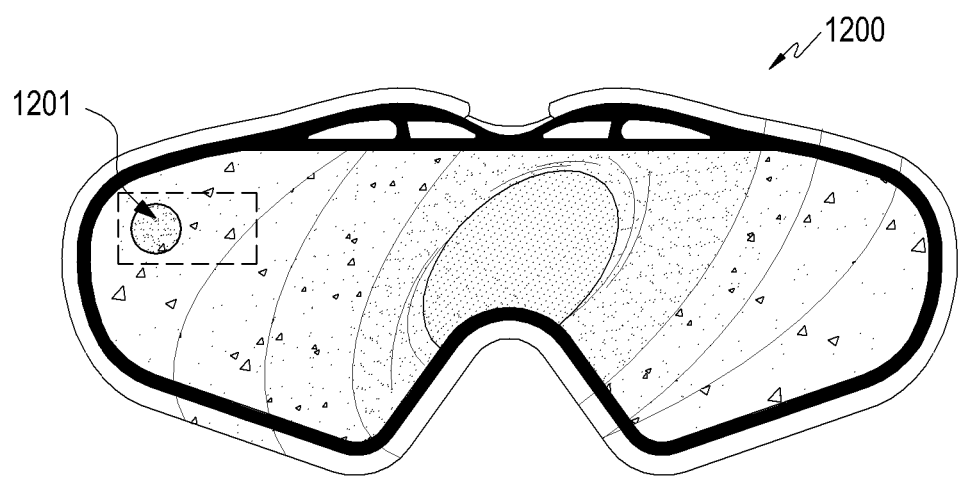

FIG. 12 provides another application 1200 of the present disclosure to explain scientific concepts. FIG. 12 shows educational VR content explaining different galaxies and stars in the sky to the user. Being a 3-D view, it's easy for a user to miss a few galaxies. However, according to the present disclosure, the user will be shown the part of universe he has not seen, by dotted box 1201 or a different color.

In another example, there is a chemical reaction where liquid A reacts with liquid B and produces a new gas C. C reacts with another gas D. It is possible that a student saw the reaction between A and B, but since the reaction between C and D was shown up in the sky for a better representation (being gases), he did not move his head up and missed the C+D reaction. The teachings from the present disclosure will detect such scenarios and inform the student what he missed. This scenario can be useful for a content creator as well. If, out of 100 students, 90 are not watching the reaction between C and D, that likely means the content is not prompting students to move their heads upward towards the sky. This information can be a recommendation to the content creator that some changes are needed.

In another example, the VR device can be used in a flight simulator for training future pilots. If trainee pilots are not practicing some of the scenarios mentioned in the VR training manual, it could inhibit their expertise in manoeuvring the aircraft. In such cases, recommendations can be sent to trainees, as well as trainers, to make necessary changes to correct the training course.

Figure 13:
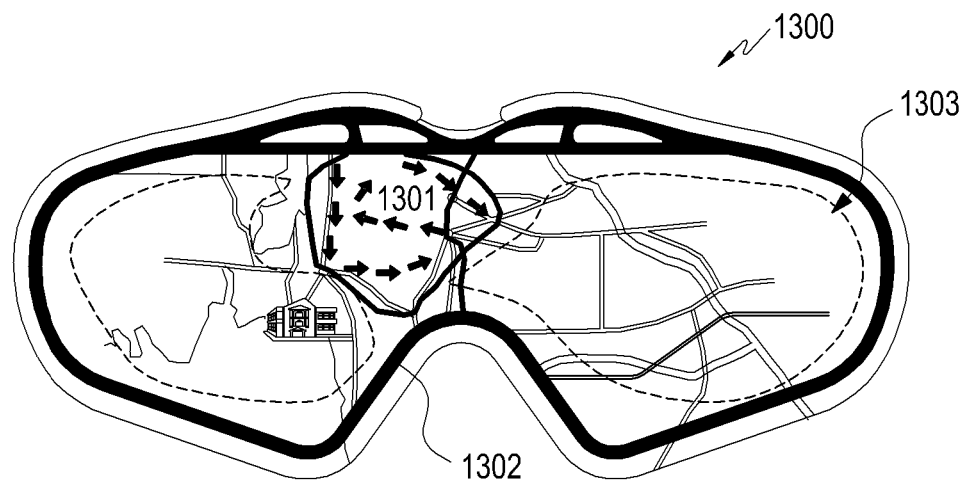

FIG. 13 provides another application 1300 of the present disclosure in real estate/tourism. FIG. 13 shows a virtual map of a city.

As shown in FIG. 13, when a user takes a virtual tour of the city, he follows the path as indicated by the arrows 1301. The areas marked encircled by thick solid lines 1302 indicate the user has seen them, and the areas encircled by dotted lines 1303 indicate the user has missed them. A path traversed 1301 by a user in the virtual map is identified while taking the tour of said city through a HMD. Further, one or more sights of the virtual map are identified that have been seen by the user while traversing said path 1301. The identified path 1301 is analyzed to determine missed 1303 or viewed 1302 areas of the virtual map to determine missed or viewed sights of on said path 1301.

In another example, a real estate agent may be advertising an expensive hotel property overlooking a golf course on one side and a beach on the other side. If users do not see the beach because a side-wall is covering the view of it in a virtual tour of the property, such that one has to move his head all the way to the right to see the beach, the users may never know that the property borders a beach. In such scenarios, it may be helpful for a client, as well as the agent, to know that beach has not been seen.

Figure 14:
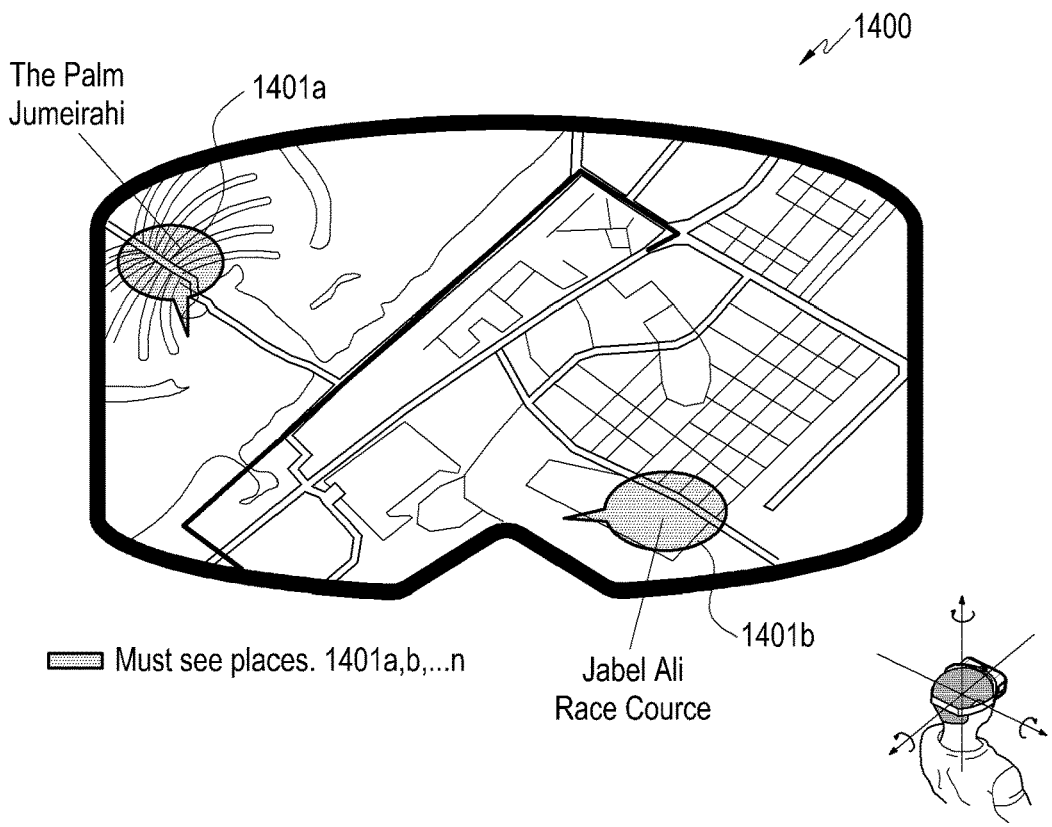

FIG. 14 illustrates another use case 1400 of the present disclosure based on history or popular culture. FIG. 14 shows must-see places 1401a, b, . . . n of Dubai city when a user is taking a virtual tour. This can be based on what is most famous in the city, what is trending on social media, or based on sponsorships or any other criteria decided by a content creator.

For example, a user is taking a virtual tour of the city of Dubai during the Dubai annual shopping festival. A path traversed by a user during the shopping festival is identified while the user is taking a virtual tour of the city of Dubai through a HMD. Further, one or more portions of the virtual tour that have been played on the HMD are identified. The identified path is analyzed to determine missed or viewed areas of the virtual tour, while the identified one or more portions are analyzed to determine missed or viewed portions in those areas of Dubai city.

The content creator of the virtual tour of Dubai city can create a list of must-see items 1401a,b, . . . n that will contain the most important hot-spots during the shopping festival. If a user misses any of those places, for example Palm Jumeirahi 1401a, during his virtual tour, he will be prompted to see those places. The must-see items 1401a,b, . . . n can be based on a particular trend on social media. For example, if the most prominent attraction of the first day is fireworks. On social media, #Fireworks may be trending on day 1. Based on the trend of that day, a must-see item may be changed and a corresponding recommendation to the user can be provided. On the second day of the shopping festival, friends of the user may be trending #MagicShow@Jabel_Ali_Race_Course, and so the Jabel Ali Race Course 1401b may be added to the list of must-see places 1401a,b, . . . n. The list of must-see places 1401a,b, . . . n can be hardcoded into the content while the content is created, or it can come from a server connected to the VR device, for example, based on social media hashtags, what's popular in the city, interests of multiple users, friends' recommendations, or what has been popular in the past.

In an embodiment of the present disclosure, the must-see items list can be based on a user's personal preferences. For example, a user may choose one or more of following interests—history, architecture, shopping, kids activities, adventure, art, fashion, food, or bars. Based on his choice, the list of must-see places will be customized and recommendations be will be provided accordingly.

Figure 15:
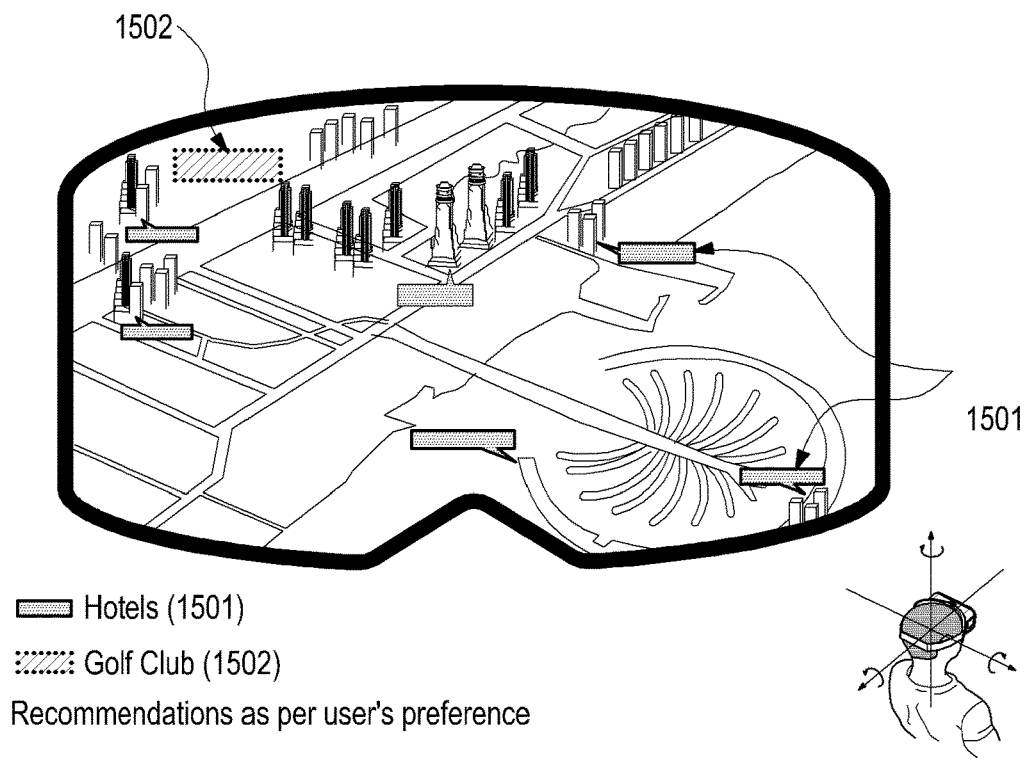

FIG. 15 shows another application 1500, where user has selected Hotels 1501 and Golf 1502 as his interests. The recommendations given by the recommendation module 370 of FIG. 3 can be based on personal preferences 1501 and 1502.

Figure 16:
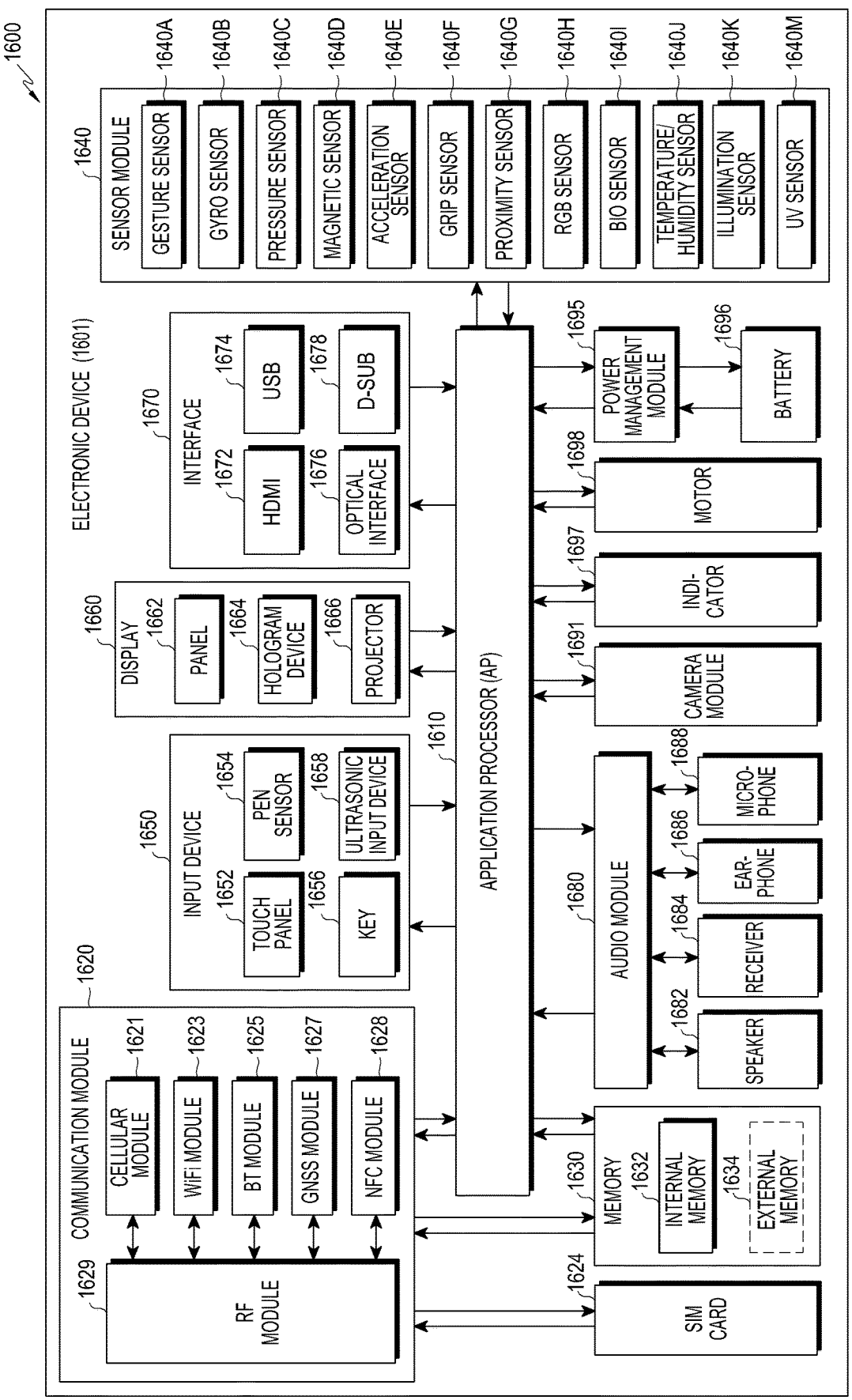
FIG. 16 illustrates an architecture of an apparatus to which the method of the present disclosure is applicable, according to an embodiment of the present disclosure.

FIG. 16 illustrates an architecture of an apparatus to which the method of the present disclosure is applicable, according to an embodiment of the present disclosure.

The apparatus 1600 may be, for example, a whole or a part of the electronic device 100, 202 or HMD 102, 200 illustrated in FIG. 1 and FIG. 2.

Referring to FIG. 16, the apparatus 1600 may include one or more APs 1610, a communication module 1620, a SIM card 1624, a memory 1630, a sensor module 1640, an input device 1650, a display 1660, an interface 1670, an audio module 1680, a camera module 1691, a power management module 1695, a battery 1696, an indicator 1697, and a motor 1698.

The AP 1610 may control one or more hardware or software components that are connected to the AP 1610 by executing an OS or an application program and may perform processing or computation of various types of data including multimedia data. The AP 1610 may be implemented, for example, as an SoC. According to an embodiment of the present disclosure, the AP 1610 may include a GPU.

The AP 1610 may be configured to identify a path traversed by a user in a virtual environment while consuming interactive content through an HMD; to identify one or more portions of the interactive content that have been played on the HMD; and to analyze the identified path to determine missed or viewed sections of the virtual environment and analyze the identified one or more portions to determine missed or viewed portions of the interactive content.

The communication module 1620 (i.e., the communication interface 160) may transmit and receive data between the apparatus 1600 (i.e., the electronic device 100) and the electronic device 104 or the server 106. The communication module 1620 may include a cellular module 1621, a WiFi module 1623, a BT module 1625, a GPS module 1627, an NFC module 1628, and an RF module 1629. The communication module 1620 may be configured to provide a report generated by a reporting module or recommendations generated by a recommendations module to a remote device.

The cellular module 1621 may provide services such as voice call, video call, SMS, or the Internet, via a communication network (i.e., LTE, LTE-A, CDMA, WCDMA, UMTS, WiBro, or GSM). The cellular module 1621 may identify and authenticate electronic devices within a communication network, using the SIM card 1624. The cellular module 1621 may perform at least a part of the functionalities of the AP 1610. For example, the cellular module 1621 may perform at least a part of multimedia control functionality.

The cellular module 1621 may include a CP. The cellular module 1621 may, for example, be implemented as an SoC. Although components such as the cellular module 1621 (for example, the CP), the memory 1630, or the power management module 1695 are shown in FIG. 16 as separately configured from the AP 1610, the AP 1610 may include, or be integrated with, one or more of the foregoing components (i.e., the cellular module 1621).

The AP 1610 or the cellular module 1621 (for example, the CP) may process instructions or data received from at least one of a non-volatile memory or other components by loading the instructions or the data in a volatile memory. Also, the AP 1610 or the cellular module 1621 may store at the non-volatile memory at least one of data received from at least one of the other components or data generated by at least one of the other components.

Each of the WiFi module 1623, the BT module 1625, the GPS module 1627, and the NFC module 1628 may include a processor that may process data received or transmitted by the respective modules. Although FIG. 16 shows the cellular module 1621, the WiFi module 1623, the BT module 1625, the GPS module 1627, and the NFC module 1628 as separate components, two or more of the cellular module 1621, the WiFi module 1623, the BT module 1625, the GPS module 1627, and the NFC module 1628 may be included in an IC or an IC package. At least some of the processors corresponding to the respective cellular module 1621, the WiFi module 1623, the BT module 1625, the GPS module 1627, or the NFC module 1628 may be implemented as a single SoC. A CP corresponding to the cellular module 1621 and a WiFi processor corresponding to the WiFi module 1623 may be implemented as a single SoC.

The RF module 1629 may transmit and receive data, such as RF signals and may include a transceiver, a power amplifier module (PAM), a frequency filter, or a low noise amplifier (LNA). The RF module 1629 may further include one or more components for transmitting and receiving electro-magnetic (EM) waves in free space, such as conductors or conductive wires. Although FIG. 16 shows that the cellular module 1621, the WiFi module 1623, the BT module 1625, the GPS module 1627, and the NFC module 1628 share the single RF module 1629, at least one of the cellular module 1621, the WiFi module 1623, the BT module 1625, the GPS module 1627, or the NFC module 1628 may transmit and receive RF signals via a separate RF module.

The SIM card 1624 may be a card including a SIM, and may be configured to be inserted into a slot disposed at a specified location of the electronic device. The SIM card 1624 may include a unique identifier (i.e., integrated circuit card IDentifier (ICCID)) or subscriber information (i.e., international mobile subscriber identity (IMSI)).

The memory 1630 (i.e., the memory 130) may include an internal memory 1632 or an external memory 1634. The internal memory 1632 may be at least one of, for example, a volatile memory (i.e., DRAM, SRAM, or SDRAM) or a non-volatile memory (i.e., OTPROM, PROM, EPROM, EEPROM, mask ROM, flash ROM, NAND flash memory, or NOR flash memory).

The internal memory 1632 may be an SSD. The external memory 1634 may be a flash drive (i.e., a CF drive, a SD, a micro-SD, a mini-SD, an xD, or a memory stick). The external memory 1634 may be operatively coupled to the apparatus 1600 via various interfaces. The apparatus 1600 may further include recording devices (or recording media) such as a hard disk drive (HDD). The memory 1630 may include one or more modules. For example, the memory 1630 may comprise a reporting module to generate a report for improving creation of the interactive content based on the analysis of the identified path and the identified one or more portions, the report listing the missed or viewed sections of the virtual environment and the missed or viewed portions of the interactive content. The memory 1630 may comprise a recommendation module to recommend an important section of the virtual environment or an important portion of the interactive content to the user through the HMD. The memory 1630 may comprise a correction module to automatically or in response to a user input modify the interactive content on the basis of said report or recommendations.

The sensor module 1640 may measure physical properties or detect operational states associated with the apparatus 1600, and convert the measured or detected information into electric signals. The sensor module 1640 may include at least one of, a gesture sensor 1640A, a gyro sensor 1640B, an atmospheric pressure sensor 1640C, a magnetic sensor 1640D, an accelerometer sensor 1640E, a grip sensor 1640F, a proximity sensor 1640G, a color sensor 1640H (i.e., a red, green, blue (RGB) sensor), a biometric sensor 1640I, a temperature/humidity sensor 1640J, an illuminance sensor 1640K, or a UV sensor 1640M. Additionally or alternatively, the sensor module 1640 may include, an electrical-nose sensor, an EMG sensor, an EEG sensor, an IR sensor, an iris sensor, or a finger print sensor. The sensor module 1640 may further include a control circuit for controlling one or more sensors included therein.

The input device 1650 may include a touch panel 1652, a digital pen sensor 1654, a key 1656, or an ultrasonic input device 1658. The touch panel 1652 may detect a touch input using at least one of, for example, capacitive, resistive, infrared, and ultrasonic methods. The touch panel 1652 may further include a control circuit. A capacitive-type touch panel may detect physical touch inputs or proximity inputs. The touch panel 1652 may further include a tactile layer, which may provide haptic feedback to the user.

The digital pen sensor 1654 may be implemented using methods identical to or similar to receiving a touch input from a user, or using a separate detection sheet. The key 1656 may include a physical button, an optical key, or a keypad. The ultrasonic input device 1658 may be a device configured to identify data by detecting, using a microphone 1688, ultrasonic signals generated by a device capable of generating the ultrasonic signal. The ultrasonic input device 1658 may detect data wirelessly. The apparatus 1600 may receive a user input from an external device (i.e., a computer or a server) connected to the apparatus 1600 using the communication module 1620.

The display module 1660 (i.e., the display 150) may include a panel 1662, a hologram device 1664, or a projector 1666. The panel 1662 may be, for example, a LCD or an active-matrix organic light-emitting diode (AM-OLED) display. The panel 1662 may be configured to be flexible, transparent, or wearable. The panel 1662 and the touch panel 1652 may be implemented as a single module. The hologram device 1664 may utilize the interference of light waves to provide a three-dimensional image in empty space. The projector 1666 may provide an image by projecting light on a display. The display may be positioned inside or outside the apparatus 1600. The display module 1660 may further include a control circuit for controlling the panel 1662, the hologram device 1664, or the projector 1666.

The interface 1670 may include a high-definition multimedia interface (HDMI) 1672, a USB 1674, an optical interface 1676, or a D-sub 1678. The interface 1670 may be incorporated into the communication interface 160 illustrated in FIG. 1. Additionally or alternatively, the interface 1670 may include a mobile high-definition link (MHL) interface, an SD/multimedia card, or an Infrared Data Association (IrDA) interface.

The audio module 1680 may encode or decode a voice into an electrical signal, and vice versa. At least a part of the components of the audio module 1680 may be incorporated in the I/O interface 140 illustrated in FIG. 1. The audio module 1680 may process audio information input into, or output from a speaker 1682, a receiver 1684, an earphone 1686, or the microphone 1688.

The camera module 1691 may capture still images or a video and may include one or more image sensors (i.e., a front sensor or a rear sensor), a lens, an image signal processor (ISP), or a flash (i.e., a LED or a Xenon lamp).

The power management module 1695 may manage power of the apparatus 1600 and may include a power management integrated circuit (PMIC), a charger IC, or a battery gauge.

The PMIC may be disposed in an IC or an SoC semiconductor. The charging method for the apparatus 1600 may include wired or wireless charging. The charger IC may charge a battery, or prevent excessive voltage or excessive current from a charger from entering the apparatus 1600. The charger IC may include at least one of a wired charger IC or a wireless charger IC. The wireless charger IC may be a magnetic resonance type, a magnetic induction type or an electromagnetic wave type, and may include additional circuits for wireless charging, such as a coil loop, a resonance circuit, or a rectifier.

The battery gauge may measure a charge level, a voltage, a current, or a temperature of the battery 1696. The battery 1696 may store or generate electricity and supply power to the apparatus 1600 using the stored or generated electricity. The battery 1696 may include a rechargeable battery or a solar battery.

The indicator 1697 may indicate one or more states (i.e., a boot status, a message status, or a charge status) of the apparatus 1600 or a part of the apparatus 1600 (i.e., the AP 1610). The motor 1698 may convert an electrical signal into a mechanical vibration. The apparatus 1600 may include a device for supporting mobile TV (i.e., a GPU). The device for supporting mobile TV may process media data compliant with digital multimedia broadcasting (DMB), digital video broadcasting (DVB), or media flow.

Each component of an electronic device, described above, may include one or more components, and each component's name may vary according to the type of the electronic device. The electronic device may include at least one of the above-described components, and some components may be omitted or additional components may be included. Also, some of the components may be hardware and may be combined into a single component to perform functions identical to those of the respective components before their combination. Similarly, some of the components may be hardware and may be split into a plurality of entities that collectively perform functions identical to those of the respective component before their split.

The term "module" as used herein may include a unit of one, or a combination of two or more, hardware, software or firmware. The term "module" may be used interchangeably with the terms "unit", "logic", "logical block", "component", or "circuit". A module may be the smallest unit for performing one or more functions, or a portion thereof. A module may be implemented mechanically or electronically and may include at least one of a known or to-be-developed ASIC chip, FPGA or programmable logic device that perform certain operations.

At least a part of the preceding devices (i.e., modules or their functions) or methods (i.e., operations) may be implemented in the form of a programming module as commands stored in a non-transitory computer-readable storage medium. When a command is executed by one or more processors (i.e., the processor 120), the one or more processors execute a function corresponding to the command. The non-transitory computer-readable storage medium may be the memory 130. At least a part of the programming module may be implemented (executed) by the processor 120. At least a part of the programming module may include a module, a program, a routine, a set of instructions, or a process to execute one or more functions.

The non-transitory computer-readable recording medium may include any kind of hardware device configured to store a program command (i.e., a programming module). The hardware device may include magnetic media such as a hard disk, a floppy disk, a magnetic tape, an optical media (i.e., a compact disc read only memory (CD-ROM) or a digital versatile disc (DVD)), and a magneto-optical media (i.e., a floptical disk, a ROM, a RAM, and a flash memory). The program command may include a premium language code that can be executed in a computer using an interpreter as well as a mechanical code produced by a compiler. The above-mentioned hardware device may also be implemented as one or more software modules.

A module or a programming module may include one or more of the above-described components, may omit a portion thereof, or may include additional components. Operations that are performed by a module, a programming module or other components may be processed in a serial, parallel, repetitive or heuristic manner, and some operations may be omitted or additional operations may be added.

A non-transitory computer-readable storage medium storing commands may be provided. The commands may be to allow at least one processor to perform at least one operation, when the commands are executed by the at least one processor. The at least one operation may include identifying a path traversed by a user in a virtual environment while consuming interactive content through an HMD; identifying one or more portions of the interactive content that have been played on the HMD; and analyzing the identified path to determine missed or viewed sections of the virtual environment and analyzing the identified one or more portions to determine missed or viewed portions of the interactive content.

While the present disclosure has been shown and described with reference to certain embodiments, it will be understood by those skilled in the art that various changes in form and details may be made therein without departing from the spirit and scope of the present disclosure, which is defined, not by the detailed description and embodiments, but by the appended claims and their equivalents.

What is claimed is:

1. An apparatus comprising:
 a communication interface configured to transmit or receive data;
 a memory associated with at least one processor; and
 the at least one processor configured to:
  identify one or more important portions of interactive content based on at least one of a user context and a type of the interactive content,
  identify a path traversed by a user in a virtual environment related to the interactive content while providing the interactive content through a head mounted display connected with the apparatus,
  identify one or more first portions of the interactive content that have been played on the head mounted display, based on the path traversed by the user in the virtual environment,
  analyze the one or more first portions to identify whether one or more second portions missed by the user exist from among the one or more important portions of the interactive content,
  in response to the existence of the one or more second portions missed by the user, differently display viewed interactive content and non-viewed interactive content,
  provide head movement suggestions in the virtual environment for exploring the one or more second portions missed by the user, and
  generate a report comprising an overall score of effectiveness of the interactive content based on the path, a number of the one or more first portions, and a number of the one or more second portions.

2. The apparatus as claimed in claim 1, wherein the at least one processor is further configured to perform at least one of: pointing, highlighting, captioning, or color coding on the one or more second portions of the interactive content.

3. The apparatus as claimed in claim 1, wherein the at least one processor is further configured to:
 receive data from a position and orientation sensor of the head mounted display.

4. The apparatus as claimed in claim 1, wherein the at least one processor is further configured to recommend the one or more important portions of the interactive content to the user through the head mounted display.

5. The apparatus as claimed in claim 4, wherein the one or more important portions of the interactive content are recommended to the user in real time while the user is consuming the interactive content or after the interactive content is played completely.

6. The apparatus as claimed in claim 4, wherein the one or more important portions of the interactive content are contextually identified based on points of interests to the user as captured from one or more data sources.

7. The apparatus as claimed in claim 1, wherein the communication interface is further configured to provide the report or recommendations to a remote device.

8. The apparatus as claimed in claim 1, wherein the at least one processor is further configured to automatically, or in response to a user input, modify the interactive content based on the report or recommendations.

9. The apparatus as claimed in claim 1, wherein the apparatus is an integral part of the head mounted display or an electronic device communicatively coupled with the head mounted display, and
 wherein the head mounted display is capable of playing the interactive content including at least one of an immersive content, a 3D content, a virtual reality content, and a 360 degree content.

10. A method comprising:
 identifying one or more important portions of interactive content based on at least one of a user context and a type of the interactive content;
 identifying a path traversed by a user in a virtual environment related to the interactive content while providing the interactive content through a head mounted display;
 identifying one or more first portions of the interactive content that have been played on the head mounted display, based on the path traversed by the user in the virtual environment;
 analyzing the one or more first portions to identify whether one or more second portions missed by the user exist from among the one or more important portions of the interactive content;
 in response to existence of the one or more second portions missed by the user, differently displaying viewed interactive content and non-viewed interactive content;
 providing head movement suggestions in the virtual environment for exploring the one or more second portions missed by the user; and
 generating a report comprising an overall score of effectiveness of the interactive content based on the path, a number of the one or more first portions, and a number of the one or more second portions.

11. The method as claimed in claim 10, wherein processing the interactive content comprises at least one of pointing, highlighting, captioning, or color coding on the one or more second portions of the interactive content.

12. The method as claimed in claim 10, further comprising:
 recommending the one or more important portions of the interactive content to the user through the head mounted display.

13. The method as claimed in claim 12, wherein the one or more important portions of the interactive content are recommended to the user in real time while the user is consuming the interactive content or after the interactive content is played completely.

14. The method as claimed in claim 12, wherein the one or more important portions of the interactive content are contextually identified based on points of interests to the user as captured from one or more data sources.

15. The method as claimed in claim 10, further comprising:
 providing the report or recommendations to a remote device.

16. The method as claimed in claim 10, further comprising:
 modifying, automatically or in response to a user input, the interactive content based on the report or recommendations.

17. The method as claimed in claim 10, wherein the head mounted display is capable of playing the interactive content including at least one of an immersive content, a 3D content, a virtual reality content, and a 360 degree content.

* * * * *